United States Patent
Yablon

(10) Patent No.: US 9,420,096 B1
(45) Date of Patent: Aug. 16, 2016

(54) UNIFIED METHOD AND APPARATUS TO SIMPLIFY TELEPHONE AREA CODE DIALING

(71) Applicant: Gilbert J. Yablon, Woodland Hills, CA (US)

(72) Inventor: Gilbert J. Yablon, Woodland Hills, CA (US)

( * ) Notice: Subject to any disclaimer, the term of this patent is extended or adjusted under 35 U.S.C. 154(b) by 0 days.

(21) Appl. No.: 14/849,717

(22) Filed: Sep. 10, 2015

Related U.S. Application Data

(63) Continuation of application No. 14/312,625, filed on Jun. 23, 2014, now Pat. No. 9,137,343, which is a continuation of application No. 13/772,907, filed on Feb. 21, 2013, now Pat. No. 8,767,949, which is a continuation of application No. 13/101,345, filed on May 5, 2011, now Pat. No. 8,385,537, which is a continuation of application No. 12/758,099, filed on Apr. 12, 2010, now Pat. No. 7,940,918, which is a continuation of application No. 10/707,956, filed on Jan. 28, 2004, now Pat. No. 7,697,678, which is a continuation of application No. 10/065,273, filed on Sep. 30, 2002, now Pat. No. 6,687,365, which is a continuation of application No. 09/683,598, filed on Jan. 23, 2002, now abandoned, which is a continuation of application No. 09/567,832, filed on May 9, 2000, now Pat. No. 6,343,125, which is a continuation-in-part of application No. 09/085,781, filed on May 28, 1998, now Pat. No. 6,061,443.

(60) Provisional application No. 60/047,747, filed on May 28, 1997.

(51) Int. Cl.
*H04M 1/00* (2006.01)
*H04M 3/00* (2006.01)
*H04M 7/00* (2006.01)
*H04M 1/2745* (2006.01)
*H04M 3/44* (2006.01)
*H04Q 3/76* (2006.01)

(52) U.S. Cl.
CPC .. *H04M 3/44* (2013.01); *H04Q 3/76* (2013.01)

(58) Field of Classification Search
CPC ................. H04M 1/274533; H04M 1/274566; H04M 3/44
USPC ............. 379/355.06, 220.01, 355.01, 355.07, 379/355.08, 219, 121.01, 354, 216.01, 379/357.04, 356.01, 353, 352, 221.13, 379/207.11, 241

See application file for complete search history.

(56) References Cited

U.S. PATENT DOCUMENTS

| | | |
|---|---|---|
| 5,157,719 A | 10/1992 | Waldman |
| 5,226,075 A | 7/1993 | Funk et al. |
| 5,280,516 A | 1/1994 | Jang |
| 5,475,743 A | 12/1995 | Nixon et al. |
| 5,524,146 A | 6/1996 | Morrisey et al. |
| 5,524,278 A * | 6/1996 | Williams ............... H04W 48/12 455/166.2 |
| 5,768,358 A | 6/1998 | Venier et al. |
| 5,859,901 A | 1/1999 | Brendzel et al. |
| 5,892,821 A | 4/1999 | Turner |

(Continued)

*Primary Examiner* — Thjuan K Addy
(74) *Attorney, Agent, or Firm* — Jay R. Yablon

(57) ABSTRACT

A computerized method and related system and software for simplifying telephonic calling, comprising: designating a default destination area code; the user specifying a destination telephone number; and as a default, causing the call to be signaled using the designated default destination area code in combination with the specified destination telephone number, without the user entering the designated default destination area code when specifying the destination telephone number.

20 Claims, 14 Drawing Sheets

Communities Involved

Dialing Patterns

(56) References Cited

U.S. PATENT DOCUMENTS

| | | |
|---|---|---|
| 5,917,902 A | 6/1999 | Saucier |
| 5,940,490 A * | 8/1999 | Foster ............... H04M 3/42229 379/211.02 |
| 5,946,390 A | 8/1999 | Boakes |
| 6,009,158 A | 12/1999 | Romero |
| 6,061,443 A | 5/2000 | Yablon |
| 6,134,319 A | 10/2000 | Burg et al. |
| 6,298,131 B1 | 10/2001 | Veschi |
| 6,343,125 B1 | 1/2002 | Yablon |
| 6,345,095 B1 | 2/2002 | Yamartino |
| 6,477,247 B1 | 11/2002 | Burg et al. |
| 6,687,365 B1 | 2/2004 | Yablon |
| 6,751,311 B1 | 6/2004 | Arnold et al. |
| 6,856,816 B2 | 2/2005 | Porter |
| 6,940,965 B1 | 9/2005 | Arnold et al. |
| 6,947,544 B2 | 9/2005 | Yamartino |
| 7,697,678 B2 | 4/2010 | Yablon |
| 7,940,918 B1 | 5/2011 | Yablon |
| 8,249,246 B1 | 8/2012 | Yablon |
| 8,385,537 B1 | 2/2013 | Yablon |
| 8,744,066 B1 | 6/2014 | Yablon |
| 8,767,949 B1 | 7/2014 | Yablon |
| 9,137,343 B1 | 9/2015 | Yablon |
| 2003/0012359 A1 | 1/2003 | Nayhouse et al. |
| 2004/0136514 A1 | 7/2004 | Rambo |
| 2006/0002542 A1 | 1/2006 | Yamartino |
| 2006/0098799 A1 | 5/2006 | Yablon |

\* cited by examiner

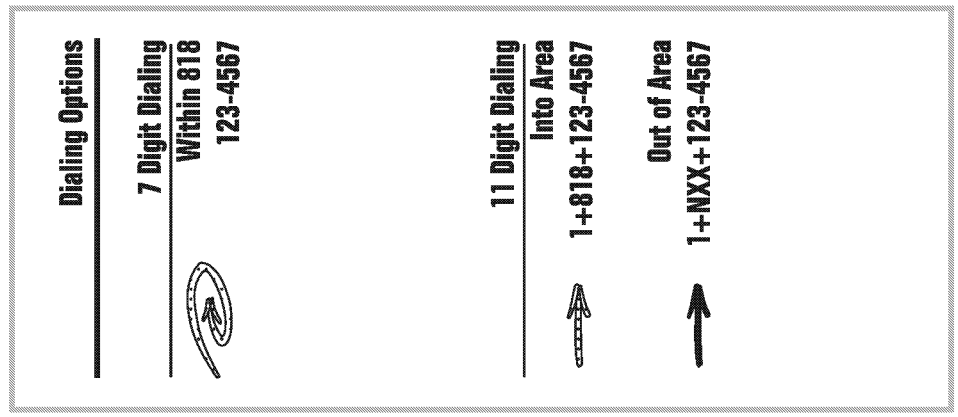
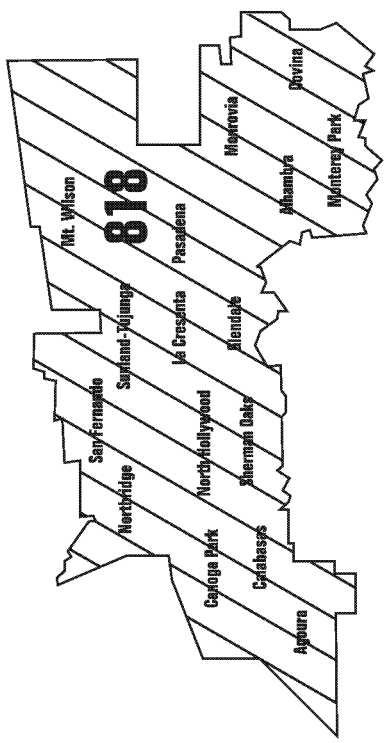
FIG. 1: Communities Involved
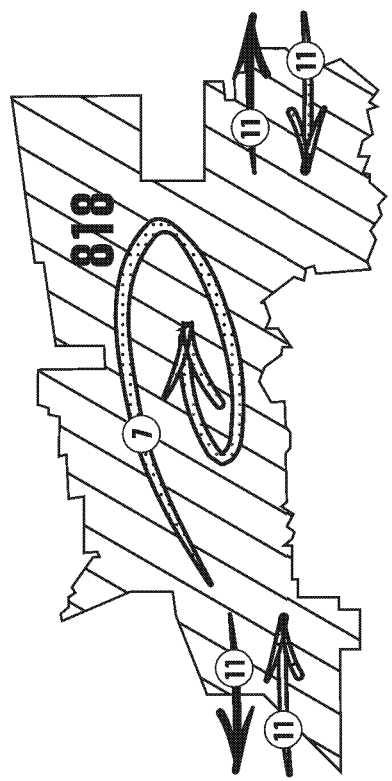
FIG. 1A: Dialing Patterns

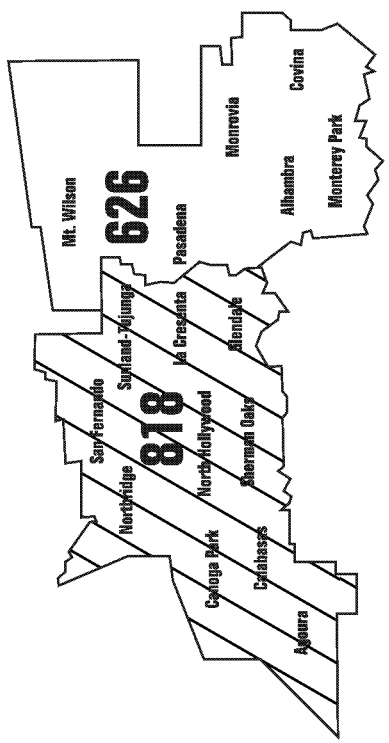
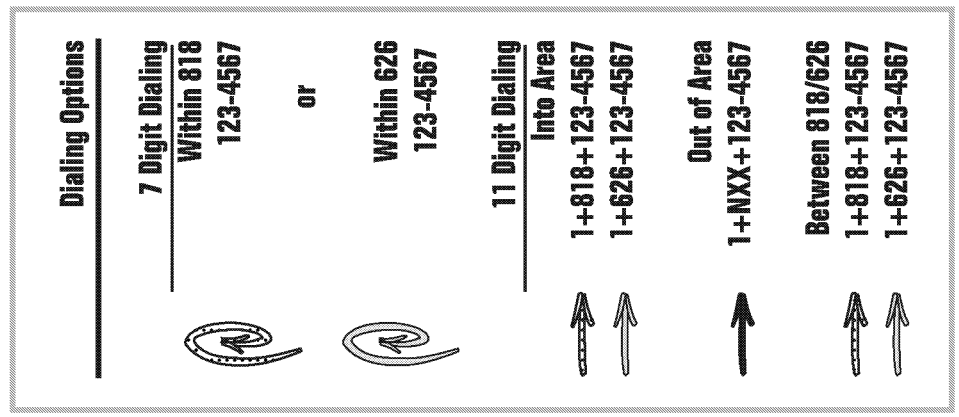
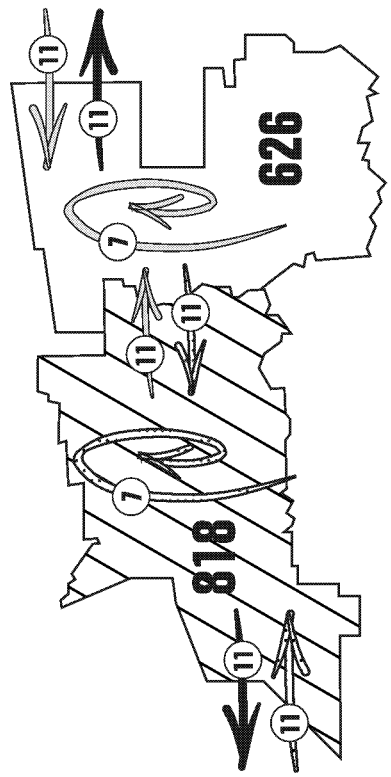
FIG. 2: Communities Involved
FIG. 2A: Dialing Patterns

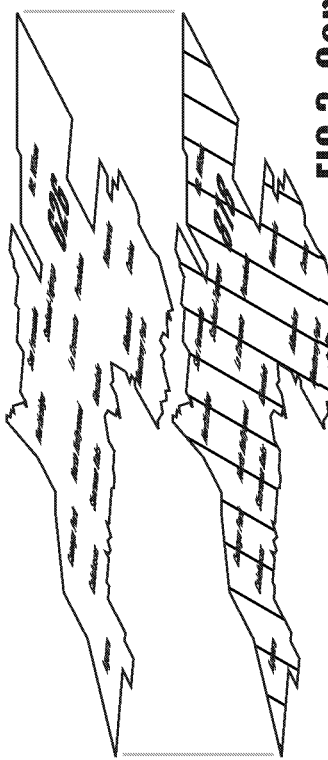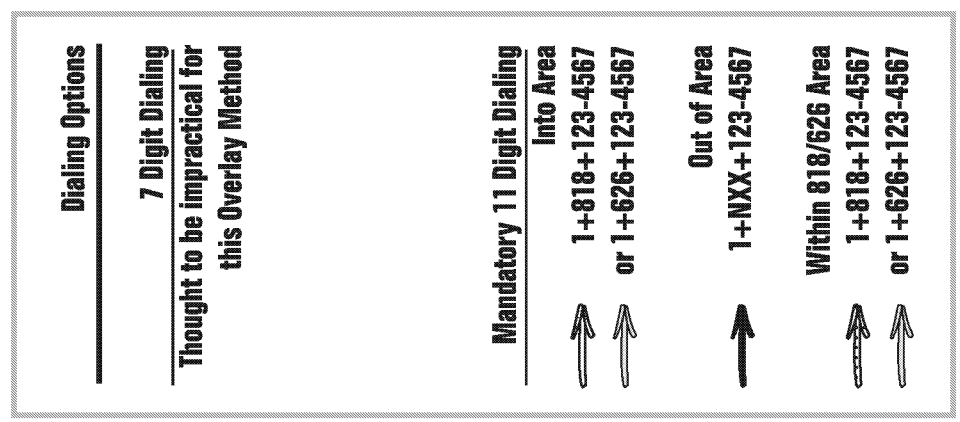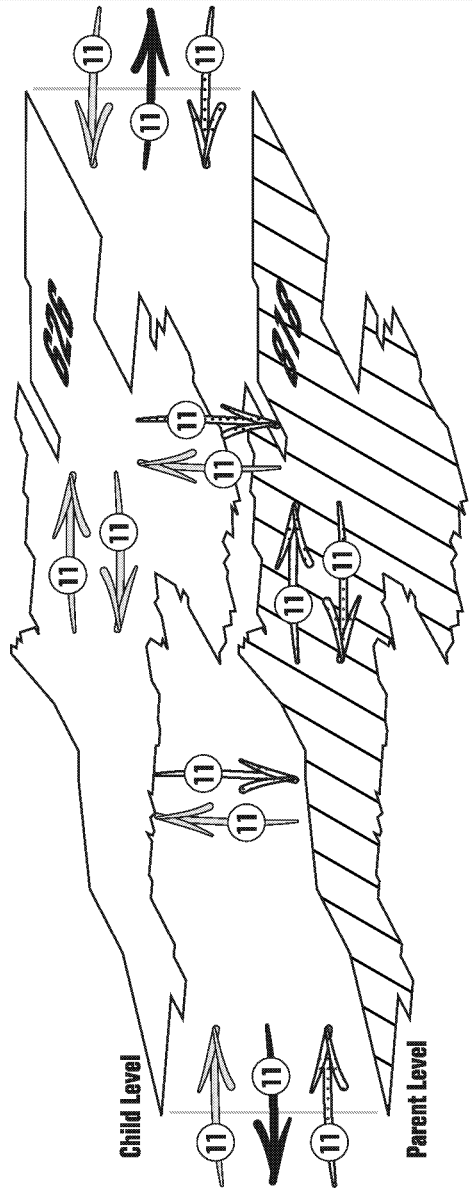

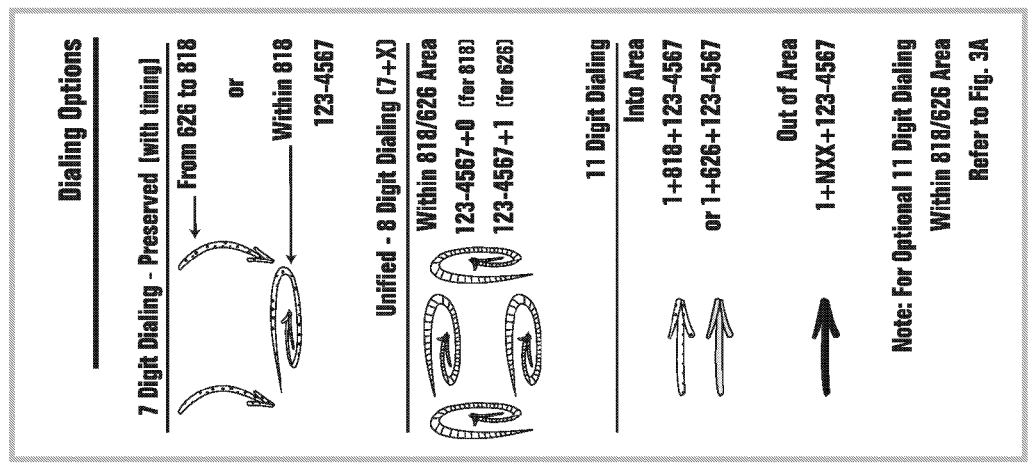
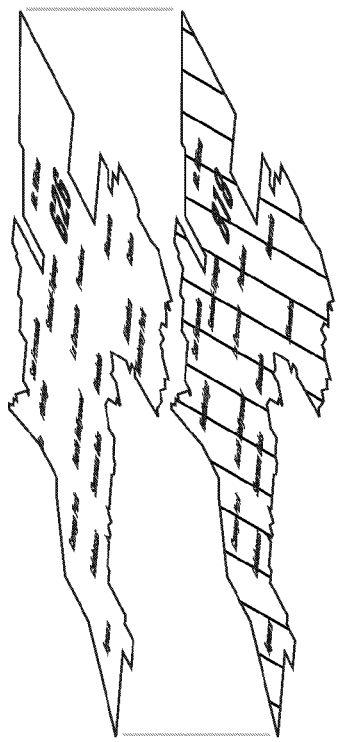
FIG. 4: Communities Involved
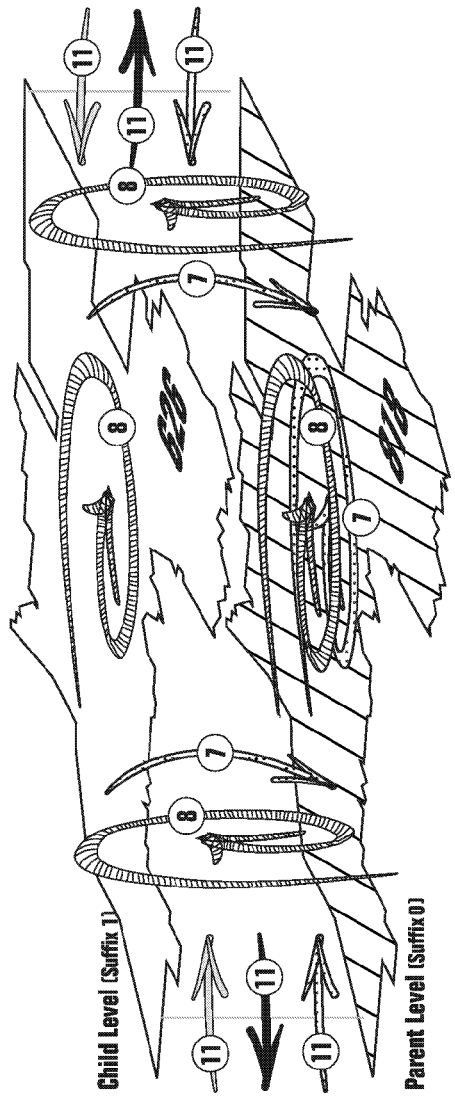
FIG. 4A: Dialing Patterns

```
Note: (NAA) - (N J J ) are distinct 3 digit area codes.
N........................ = any number 2-9
A,B,C,D,E,F,G,H,I,J = any numbers 0-9
```

Here is how the new numbers would be allocated:

(NAA)  N23-4567            current number now.

(NAA)  N23-4567 0          current number under my proposed plan.
                           note: the trailing '0' would not need to be entered by the user. Phone
                               company equipment will automatically add the '0' after a fixed time
                               (3 - 7 seconds) to complete the call if only 7 digits have been entered
                               by the user. This feature makes the plan completely non-disruptive.

(NBB)  N23-4567 1          first generation of new numbers under my proposed plan.

and if more numbers
are later needed...        note: the trailing '1 - 9' would need to be entered by
(NCC)  N23-4567 2                the user. Since these are new numbers, they will
(NDD)  N23-4567 3                always be known as 8 digit numbers from the time
(NEE)  N23-4567 4                they are first issued, and will be memorized, listed
(NFF)  N23-4567 5                in directories and dialed as such.
(NGG)  N23-4567 6
(NHH)  N23-4567 7          Since these area codes would be grouped in a single overlay area,
(N I I )  N23-4567 8       dialing within the overlay area to any of these area codes could be
(N J J )  N23-4567 9       accomplished simply by dialing the 7 digit number + the
                           appropriate siffix under the Unified Dialing Plan for Overlays.

At some point far into the future even more numbers might be needed. The same non-
disruptive system could be used to expand again at that time.

(NAA)  N23-4567 00         current number far into the future.
                           note: neither of these trailing '0's would need to be entered. If only 7
                               digits were entered, the phone company would automatically add
                               the '0' or '00' after the fixed time. Thus, the original 7 digit
                               number could still be reached by only dialing the original 7 digits.

(NBB)  N23-4567 10         first generation of new numbers far into the future.
(NCC)  N23-4567 20         note: the new trailing '0' would not need to be dialed.
(NDD)  N23-4567 30               Phone company equipment would automatically
(NEE)  N23-4567 40               add the trailing '0' just as it would for the original
(NFF)  N23-4567 50               7 digit numbers. So, no directories or habits would
(NGG)  N23-4567 60               need updating even for these numbers.
(NHH)  N23-4567 70
(N I I )  N23-4567 80
(N J J )  N23-4567 90

(NAA)  N23-4567 01  (02 03 04 05 06 07 08 09)   second generation of new numbers.
(NBB)  N23-4567 11  (12 13 14 15 16 17 18 19)
(NCC)  N23-4567 21  (22 23 24 25 26 27 28 29)
(NDD)  N23-4567 31  (32 33 34 35 36 37 38 39)
(NEE)  N23-4567 41  (42 43 44 45 46 47 48 49)
(NFF)  N23-4567 51  (52 53 54 55 56 57 58 59)
(NGG)  N23-4567 61  (62 63 64 65 66 67 68 69)
(NHH)  N23-4567 71  (72 73 74 75 76 77 78 79)
(N I I )  N23-4567 81  (82 83 84 85 86 87 88 89)              ©1997 Gilbert Yablon
(N J J )  N23-4567 91  (92 93 94 95 96 97 98 99)                  patent pending

FIG. 6

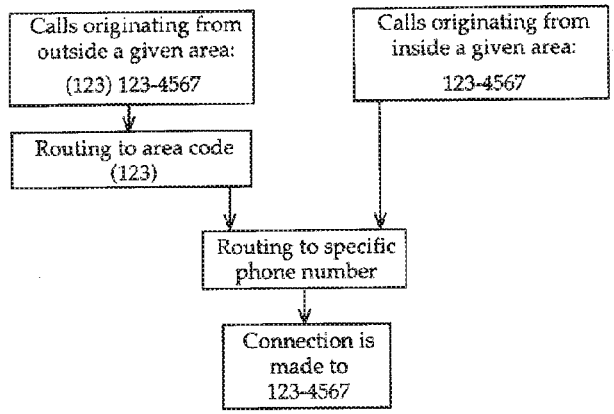
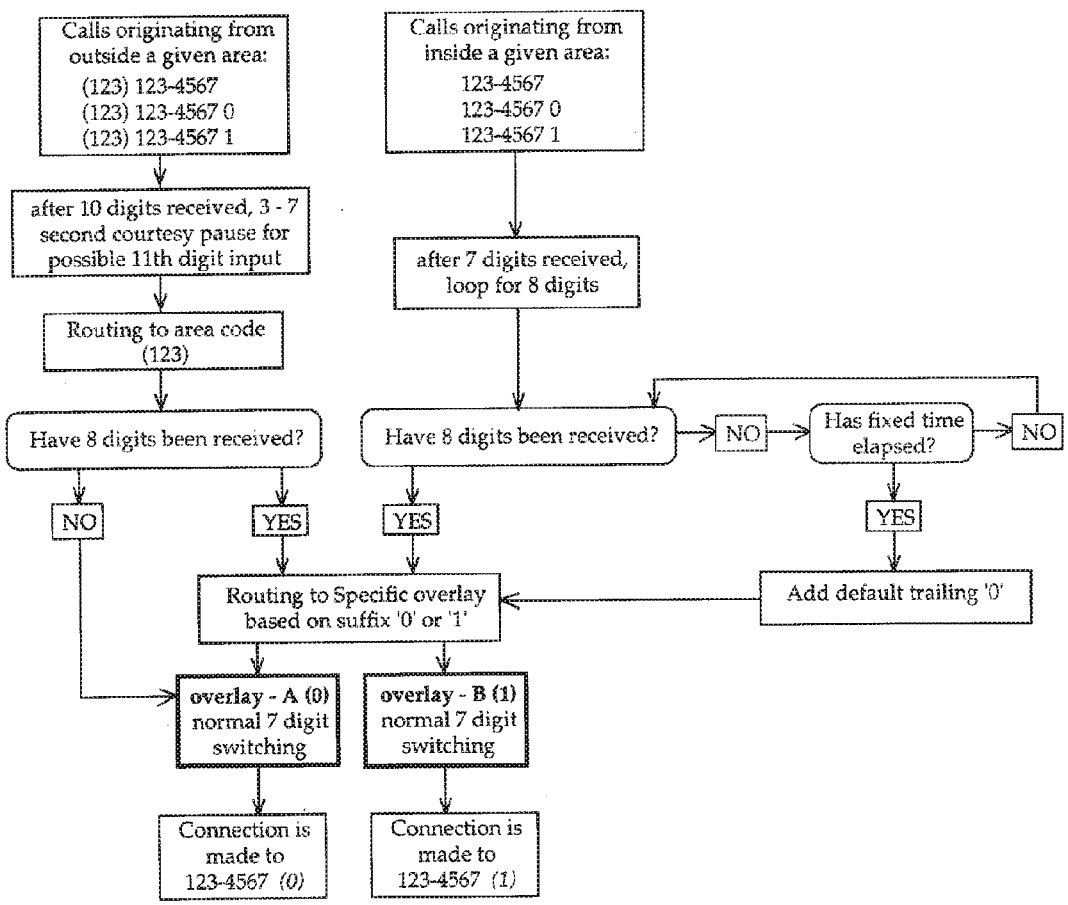
FIG. 7

Here is how the new numbers would be allocated:

(123) 123-4567            current number now.

(123) 123-4567 0          current number under my proposed plan.
                          note: the trailing '0' would not need to be entered by the user.
                          Phone company equipment will automatically add the '0' after
                          a fixed time (3 - 7 seconds) to complete the call if only 7 digits
                          have been entered by the user.

(123) 123-4567 1          first generation of new numbers under my proposed plan.

and if more numbers
are later needed...       note: the trailing '1 - 9' would need to be entered by
(123) 123-4567 2          the user. Since these are new numbers, they will
(123) 123-4567 3          always be known as 8 digit numbers from the time
(123) 123-4567 4          they are first issued, and will be memorized, listed
(123) 123-4567 5          in directories and dialed as such.
(123) 123-4567 6
(123) 123-4567 7
(123) 123-4567 8
(123) 123-4567 9

---

At some point far into the future even more numbers might be needed. The same non-disruptive system could be used to expand again at that time.

(123) 123-4567 00         current number far into the future.
                          note: neither of these trailing '0's would need to be entered. If
                          only 7 digits were entered, the phone company would
                          automatically add the '0' or '00' after the fixed time. Thus,
                          the original 7 digit number could still be reached by only
                          dialing the original 7 digits.

(123) 123-4567 10         first generation of new numbers far into the future.
(123) 123-4567 20         note: the new trailing '0' would not need to be dialed.
(123) 123-4567 30         Phone company equipment would automatically
(123) 123-4567 40         add the trailing '0' just as it would for the original
(123) 123-4567 50         7 digit numbers. So, no directories or habits would
(123) 123-4567 60         need updating even for these numbers.
(123) 123-4567 70
(123) 123-4567 80
(123) 123-4567 90

(123) 123-4567 11 (12 13 14 15 16 17 18 19)   second generation of new numbers.
(123) 123-4567 21 (22 23 24 25 26 27 28 29)
(123) 123-4567 31 (32 33 34 35 36 37 38 39)
(123) 123-4567 41 (42 43 44 45 46 47 48 49)
(123) 123-4567 51 (52 53 54 55 56 57 58 59)
(123) 123-4567 61 (62 63 64 65 66 67 68 69)
(123) 123-4567 71 (72 73 74 75 76 77 78 79)
(123) 123-4567 81 (82 83 84 85 86 87 88 89)
(123) 123-4567 91 (92 93 94 95 96 97 98 99)

FIG. 8

UNIFIED METHOD AND APPARATUS TO SIMPLIFY TELEPHONE AREA CODE DIALING

CROSS REFERENCE TO RELATED APPLICATIONS

This application is a continuation of application U.S. Ser. No. 14/312,625 filed Jun. 23, 2014, now U.S. Pat. No. 9,137,343 issued Sep. 15, 2015. Said U.S. Ser. No. 14/312,625 is a continuation of application U.S. Ser. No. 13/772,907 filed Feb. 21, 2013, now U.S. Pat. No. 8,767,949 issued Jul. 1, 2014. Said Ser. No. 13/772,907 is a continuation of application Ser. No. 13/101,345 filed May 5, 2011, now U.S. Pat. No. 8,385,537 issued Feb. 26, 2013. Said U.S. Ser. No. 13/101,345 is a continuation of U.S. Ser. No. 12/758,099 filed Apr. 12, 2010, now U.S. Pat. No. 7,940,918 issued May 10, 2011. Said Ser. No. 12/758,099 is a continuation of application Ser. No. 10/707,956 filed Jan. 28, 2004, now U.S. Pat. No. 7,697,678 issued Apr. 13, 2010. Said Ser. No. 10/707,956 is a continuation of application Ser. No. 10/065,273 filed Sep. 30, 2002, now U.S. Pat. No. 6,687,365 issued Feb. 3, 2004. Said Ser. No. 10/065,273 is in turn a continuation of application Ser. No. 09/683,598 filed Jan. 23, 2002, now abandoned, which in turn is a continuation of application Ser. No. 09/567,832, filed May 9, 2000, now U.S. Pat. No. 6,343,125, issued Jan. 29, 2002, which in turn is a continuation-in-part of application Ser. No. 09/085,781, filed May 28, 1998, now U.S. Pat. No. 6,061,443, issued May 9, 2000, which in turn claims the benefit of U.S. Provisional Application No. 60/047,747, filed May 28, 1997. All of the above-referenced documents are hereby incorporated by reference.

BACKGROUND OF INVENTION

This invention relates generally to the field of telephone numbering systems, and particularly, discloses a simplified method of dialing in connection with telephone area code overlays and area codes in general, and an associated apparatus that enables individual telephone subscribers to utilize this simplified dialing method independently of the adoption or non-adoption of this method by the telephone companies and pertinent government agencies.

As population increases, and as the use of the telephone system grows to accommodate new, non-traditional uses of switched telephone connections such as facsimile transmission, internet traffic, and related non-voice, data applications, the existing 7-digit numbering scheme for local calling is coming under increased stress. Under the existing North American numbering plan, which addresses any given telephone location by (NXX)N23-4567, where N is a digit from 2 to 9, X is any digit from 0 to 9, NXX is an area code, and N23-4567 designates a 7-digit phone number with central office prefix N23, a single area code, in theory, can only accommodate up to 8 million numbers (1 million based on the last six digits, times 8, for a first digit between 2 and 9). This is further restricted, since any given central office prefix N23, which is addressed through a single central office, and which can accommodate up to ten thousand numbers, may be under-utilized, for example, in a rural area where a central office of given N23 prefix may only serve a few hundred or a few thousand telephones. With competition developing in local loops, the so-called "CLECs" (Competitive Local Exchange Carriers) are obtaining given N23 prefixes for their own central offices, exerting further pressure on our numbering supplies. The depletion of available numbers in an area code is called "Area Code Exhaust". The process of replenishing the number supply in a numbering plan area is called "Area Code Relief".

Current solutions for Area Code Relief (splits and standard overlays) create, rather than solve, problems for customers. Recently, the widespread use of these methods has resulted in what can readily be described as a "National Area Code Disaster." Our dialing landscape has been damaged, and this damage has been expensive and disruptive for businesses and consumers. Some of the impacts from these current relief methods are outlined below.

FIGS. 1, 1A illustrate an established area code (818, as an example) before being impacted by area code relief. One solution which has been utilized, is so-called area code splitting, which is illustrated by FIGS. 2, 2A. In this solution, a geographic boundary is cut through the existing area code, the original area code (e.g. 818) is maintained on one side of the boundary, and a new area code (e.g., 626) is established on the other side of the boundary. This approach, however, is highly disruptive to telephone users both within and outside of the affected area code. Telephone owners in the new 626 area code effectively change to a new phone number overnight, and are forced to reprint letterheads, business cards, advertisements, directory listings, etc., in order to advise callers of their new area code. Callers both inside and outside the affected area code must adjust to the disrupted dialing patterns, including becoming familiar with the new numbers. Autodialers calling into the new area code, and from the new area code into the old area code, must be reprogrammed. Perhaps the only aspect of local calling which survives, is that callers within the old area code and the newly created area code can still use a 7-digit number to dial other telephones within their own area code's boundaries. However, calls across the new border between the old area code and the new area code now require 10 or 1+10-digit dialing, and disruption occurs both within and outside of the pertinent area codes. Overall, area code splitting is cumbersome, disruptive, and expensive.

An area code split forces half of the customers in the affected area to give up their existing phone numbers, cuts abbreviated (7 digit) dialing areas in half, and permanently disrupts established dialing patterns both within the affected area and into the affected area from everywhere else in the world. The overall cost just for mopping up after a single area code split is estimated to be over 40 million dollars (this includes updating signs and stationary, reprogramming of burglar alarms, fire alarms and other auto dialing systems, notifying customers and friends of number changes, modifying local phone switches, etc.). This reshuffling of phone numbers creates confusion for customers, resulting in numerous missed or misdialed phone calls for many years to come.

Another solution, illustrated by FIGS. 3, 3A, is the standard overlay method. In this method, instead of the geographic split of FIGS. 2, 2A, the new area code is "overlaid" on top of the original area code. The result is a form of "subscription-based," rather than "geographic" splitting. That is, once the original (or "parent") 818 area code (for example) nears saturation, many new local telephone subscribers will be given numbers in the new (or "child") area code, such as 626 in this example. Over time, telephones with the 626 area code and telephones with the 818 area code will be intermingled throughout the geographic area described by the original 818 area code's boundaries. A user who first subscribed to a telephone connection in the 818 area code before saturation (i.e., exhaust), and who subscribes after saturation, e.g., to a second telephone connection to run a facsimile machine, would possibly obtain a 626 number for the facsimile line, and thus could have lines with two different area codes under the same roof. Over time, the overlay area (i.e., that area served by both the parent (e.g. 818) and the child (e.g. 626) area codes) would have telephone numbers with both area codes interlaced throughout it, and a call across the street, or even within the same building, could well involve two (or more) area codes.

The advantage to this approach, is that nobody ever needs to "change" their telephone number. Existing subscribers keep their original (the "parent") area code, while new subscribers might obtain a number from the new ("child") area code. With this method, no one ever has to update advertising, letterhead etc., to inform customers and friends about the area code change, because only new subscribers would receive service in the new area code. In addition, this approach is transparent to people outside of the overlay area, whether receiving calls from, or dialing into, the overlay area. Thus, this overlay method is much less disruptive to existing subscribers than is the area code split of FIGS. 2, 2A.

The disadvantage of this method, is that it severely disrupts local dialing patterns. In particular, as illustrated, every call, even locally, now becomes a 10 or 1+10-digit call, in which the caller must supply an area code even for calls right across the street, or to the office upstairs in the same building. Thus, autodialers must be reprogrammed, directory listings must be reprinted with at least 10-digit numbers, small children or elderly or handicapped persons must learn or re-learn a more difficult dialing technique, and the simplicity of 7-digit dialing stands in peril of extinction. While the FCC mandate for dialing parity in overlays has been interpreted to require that 10 or 1+10 digit dialing be used for all overlay dialing, it would be desirable to achieve this required parity, if possible, by dialing fewer than 10 or 1+10 digits.

In summary, using standard overlays for relief also creates hardship for customers. Existing dialing patterns are disrupted for all customers in the affected area. Seven (7) digit abbreviated dialing is abandoned for less convenient (and very unpopular and controversial) 10 or 1+10 digit dialing. For all calls in a standard overlay scenario, the area code must be dialed before the 7 digit number, creating difficulty for customers—especially children, elderly, and handicapped. Many people have expressed concern that dialing multiple area codes for calls within a single geographic region will create a feeling of disunity for the area. The shift from 7 digit to 10 or 1+10 digit dialing also necessitates reprogramming for all burglar alarms, fire alarms and other automatic dialing systems which had previously been programmed with 7 digit numbers. Incomplete calls will occur when 7 digits are dialed without the area code, and it is likely that the wrong area code will often be used by mistake, which happens today even where area codes are not overlaid. And, the likelihood of misdialing at least one out of 10 or 11 digits is significantly greater than when only 7 digits are dialed (expect an increase of 42% for 10 digits and 57% for 10 or 1+10 digits).

By disrupting established dialing patterns, area code splits and standard overlays cause hardship, confusion and expense for customers, and prompt numerous misdials and wrong numbers.

It would be desirable if area code relief could be achieved with a minimum of disruption and expense. For a solution to be "preferred" it would have to satisfy both the needs of the customer and the requirements of the telecommunications industry.

It would therefore be desirable to have a numbering plan which greatly reduces the confusion and inconvenience that is associated with having multiple area codes within individual neighborhoods and households.

It would further be desirable to have a plan which is non-disruptive to existing 7 digit and 10 or 1+10 digit dialing patterns, wherein no one is put in jeopardy by a change to their local dialing plan (especially children and elderly/handicapped persons), and existing auto dialers can complete calls without reprogramming.

It would further be desirable to have a plan which reduces the likelihood that the new overlay area code will be a stigma for new businesses.

It would further be desirable to have a plan which ensures that costs to businesses and disruption overall will be kept to a minimum.

For customers, a preferred solution would: be consumer friendly; allow customers to keep their existing area codes and phone numbers; preserve all dialing patterns to established phone numbers (backward compatibility); minimize impact on children and the elderly; avoid costly reprogramming of existing burglar alarms, fire alarms and other autodialers; save consumers, businesses and telephone companies money overall; and provide long term, non-disruptive relief to exhausted area codes.

For the telecommunications industry, a preferred solution must: offer benefit to customers; be competitively neutral; be technically workable; be cost effective to implement; be built on top of the existing network so that past investment is not discarded; and limit all costs and changes in "dialing, switching, and programming" to the geographic area in which the solution is implemented.

It would be difficult to argue against an alternative which met these specifications, yet it is natural that controversy might surround it.

SUMMARY OF INVENTION

The invention disclosed herein is based on the standard overlay method of FIGS. 3, 3A, but establishes a unified dialing plan for these overlays which eliminates the need for 10 or 1+10-digit dialing within an overlay region. It avoids the disruption of area code splitting as described above in connection with FIGS. 2, 2A, and it also avoids the need to dial 10 or 1+10-digit numbers within an overlay area as in FIGS. 3, 3A.

In particular, within an overlay area, the original (parent) area code is represented by a single-digit suffix "0", and the child area code is represented by the single digit suffix "1". Subsequent child area codes can be numbered 2 through 9, before the need arises to add a second digit to the suffix. For anyone within the overlay area (from either the parent or a child area code) who is dialing to a number in the parent area code, all that is required is to dial the original 7-digit local number, followed by the single-digit suffix "0". In reference to FIG. 6, the "0" suffix causes computerized telephone number conversion device 1 (whether a central office switch 2, a custom calling service, or a customer premises equipment device 3, 4) to signal the seven digit number using the parent area code. Additionally, by default, if the first 7 digits are dialed and an eighth digit is not dialed before expiration of a predetermined timing delay, the device 1 will assume (by default) that the eighth digit is a zero, and the call will be routed to the seven digit number that was dialed, in the parent area code.

For anyone within the overlay area (from either the parent or a child area code) who is dialing to the (first) child area code, all that is required is to dial the original 7-digit local number, followed by the single-digit suffix "1", which represents the (first) child area code. This suffix will cause the telephone number conversion device to signal the given 7-digit number, but in the (first) child area code. In short, using the earlier examples, a "0" suffix or a timing delay without a suffix causes the seven digits provided to be dialed into the 818 (parent) area code, while a "1" suffix causes the seven digits provided to be dialed into the 626 (first child) area code.

This system does not in any way affect or change the standard overlay method of FIGS. 3, 3A, but rather provides a simplified method for dialing within and between overlaid area codes. Full 10 or 1+10-digit dialing could still be used by someone wishing to do so, but simplified dialing using only 8 digits (or 7 digits with a timing delay for dialing to the parent area code) can likewise be used, since each seven-digit-plus-suffix combination can be mapped precisely into a corresponding 10 or 1+10-digit number. Ideally, this method would be implemented in central office switching equipment and would become adopted as a unified dialing plan.

Alternatively, or in supplement to this, this method can be implemented through customer premises equipment (CPE) that takes an 8-digit number (or a 7-digit number plus timing delay), and converts (maps) it into the appropriate 10 or 1+10-digit number ("1"+"3 digit area code"+"7 digit telephone number"). The CPE would then send the 10 or 1+10 digits to the central office switch for signaling, while only requiring the caller to have dialed 7 or 8 digits to place the call.

In brief, the "unified method and apparatus to simplify telephone area code dialing" according to the invention comprises a dialing system which: 1) Allows for optional (not mandatory) 10 or 1+10 digit dialing within and between all area codes in the geographic overlay area; 2) Unifies all area codes in the geographic overlay area with a simple 8 digit (7+suffix) dialing system. The suffix represents one of ten possible overlaid area codes with '0' being the original area code, '1' being the first overlaid area code, '2' being a future second overlaid area code, etc. When the appropriate device (a switch, custom calling service or a computerized CPE device) receives the full 8 digits, it translates the number into a traditional 10 digit number (3 digit area code+7 digit phone number) and passes it through the network as if the number had been originally dialed as 10 or 1+10; 3) Preserves established '7 digit style' dialing to all phone numbers in the original area code from any area code within the geographic overlay area, by use of a "timing delay." Functionally the network switch, custom calling service or CPE will be looking for either 10 or 1+10 style numbers or 7+suffix style numbers. With default dialing, if only 7 digits are dialed, after an appropriate timing delay the switch will assume that '0' is the intended 8th digit and will put the call through to the original area code of the overlay area. In this way, backward compatibility is achieved for dialing to 'pre-relief phone numbers' from any area code in the geographic overlay area, and the system appears completely non-disruptive to the customer. In short, the invention offers an advanced 8 digit dialing system based on and fully compatible with overlay groupings, yet it is backward compatible with all established dialing patterns to existing (pre-relief) phone numbers.

BRIEF DESCRIPTION OF DRAWINGS

The features of the invention believed to be novel are set forth in the appended claims. The invention, however, together with further objects and advantages thereof, may best be understood by reference to the following description taken in conjunction with the accompanying drawing in which:

FIGS. 1, 1A show the established dialing patterns in an area code prior to implementing area code relief.

FIGS. 2, 2A show the prior art method of area code splitting, which disrupts established dialing patterns.

FIGS. 3, 3A show the prior art method which employs standard overlays, which also adversely impacts established dialing patterns, and how its overlaid levels are not united by a distinctive dialing plan.

FIGS. 4, 4A show a unified dialing plan for overlays in accordance with the invention, which is non-disruptive to established dialing patterns and which unifies all levels of the overlay area with a simple 8 digit dialing system.

FIG. 6 is a chart illustrating the number allocation method according to the invention.

FIG. 7 is a functional (flowchart) diagram of an alternate embodiment of the invention.

FIG. 8 is a chart illustrating the number allocation method according to alternate embodiment of the invention of FIG. 7.

DETAILED DESCRIPTION

Figure 5:
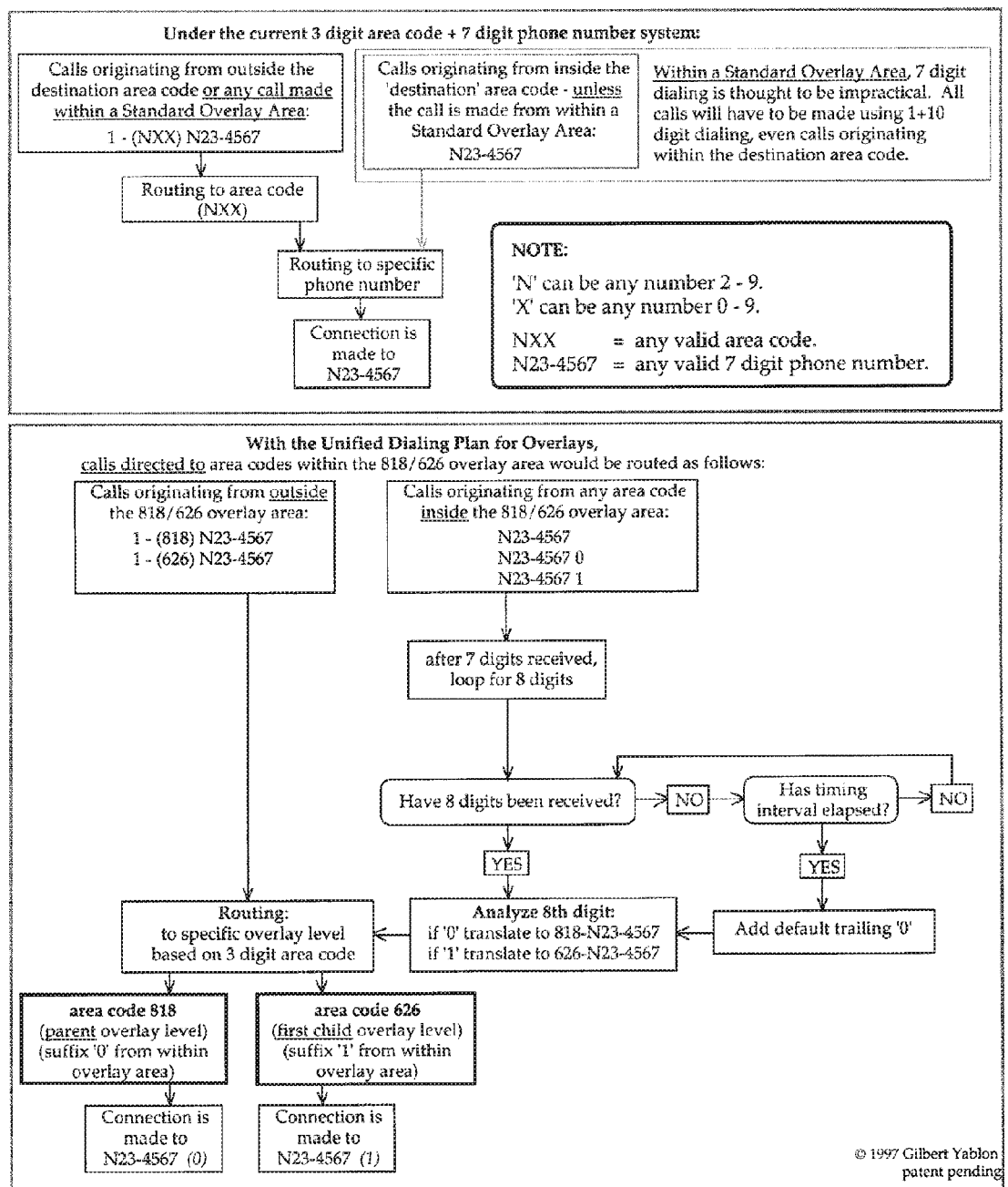
FIG. 5 is a functional (flowchart) diagram of the unified dialing plan for overlays of FIGS. 4, 4A.

FIGS. 1, 1A, 2, 2A, 3, and 3A illustrate prior art methods of allocating area codes and dialing, as was discussed earlier in the background of the invention.

FIGS. 4, 4A illustrate a dialing system which supports the implementation of overlays for area code relief by eliminating the public's main objections to them. The plan preserves established dialing patterns to existing (pre-relief) telephone numbers, and unifies all levels of an overlay area with a consistent abbreviated dialing method. Long term relief is provided for exhausted area codes without impacting dialing, switching or software in any other areas of the North American Numbering Plan (NANP).

Defining the following terms will be helpful for the discussions that follow: parent level of overlay: the original area code (in these examples the 818 area code).

child level of overlay: a new overlaid area code (in these examples the 626 area code is the first child level).

overlay area: a single geographic area which contains the parent level and all of the child overlay levels.

intra-overlay area calls: refers to calls where the origin and the destination area codes both reside within the geographic overlay area.

abbreviated dialing: dialing which requires fewer than 11 digits to complete (abbreviated dialing within an area code is typically 7 digits).

timing: as used in this Unified Dialing Plan, a predetermined interval (probably 3-4 seconds) invoked after the 7th digit of a phone number is dialed. If this interval elapses and no further digits have been entered, the phone system switch will run an analysis on the 7 digit number that has been dialed.

This technique will allow customers to dial valid phone numbers of varying lengths (7 or 8 digits).

In accordance with the invention, an overlay is implemented such that local dialing within the overlay area is facilitated by: '7 digit'+timing dialing for intra-overlay area calls directed to the parent level of the overlay from any level of the overlay. This ensures that dialing patterns to existing numbers (parent level numbers) are not disrupted with the introduction of an overlay, and can continue to be dialed with 7 digits plus a brief wait.

'8 digit' (7+suffix) dialing for intra-overlay area calls directed to any level of the overlay (parent or child). This is a '7+x' system, where the 8th digit is a suffix and acts as an overlay selector. Each area code within the overlay area is assigned a unique identifier, which is to be used as the '8th digit suffix' or 'overlay selector' in dialing. This feature unifies all levels of the overlay area with consistent abbreviated dialing, regardless of the originating or destination overlay area codes. The parent is assigned a "0" for the eighth-digit suffix, the first child is assigned a "1", and subsequent children are assigned "2" through "9". When only seven digits are dialed followed by the timing delay, it is assumed by default that the eighth digit is a "0", and the call is routed accordingly.

10 or 1+10 digit dialing, as used in the standard overlay method, is permissive, but not mandatory, throughout the entire overlay area. Every 7 or 8 digit number has a unique correspondence with (mapping to) a 10 or 1+10 digit number.

FIGS. 4 and 4A, and FIGS. 5 and 6, illustrate how these three dialing methods are integrated in accordance with the invention. While this plan is applicable to any area where an overlay might need to be implemented, for ease of illustration it will be described by example using 818 as the original area code, and 626 as the first new 'overlaid' (child) level.

Within the overlay area only (i.e., the example 818/626 overlay area), the suffixes for intra-overlay area dialing are determined as follows: All 818 numbers receive a suffix of '0' (representing the parent level). All 626 numbers receive a suffix of '1' (representing the first child level). Any future overlay levels receive a suffix of '2'-'9' in that order. This framework allows for easy future expansion when more telephone numbers are needed.

Thus, for calls originating anywhere within the 818/626 overlay area, dialing 123-4567-0 (to the parent level) is fully equivalent to dialing 1-818-123-4567, and indeed either style of dialing is valid and will successfully place the call. Similarly, dialing 123-4567-1 (to the first child level) is fully equivalent to dialing 1-626-123-4567, and again, either style of dialing is valid and will successfully place the call. For dialing to a second child level within an 818/626/??? overlay area, with a second child area code designated by ???, dialing 123-4567-2 (to the second child) is fully equivalent to dialing 1-???-123-4567, and again, either style of dialing is valid and will successfully place the call.

Further, all 818 (parent) numbers can also be reached from any level of the overlay area simply by dialing the original 7 digit number and then waiting for a short timing delay. This feature of the invention makes the introduction of an overlay completely non-disruptive to the existing dialing patterns of the original area code.

For example, for calls originating anywhere within the 818/626/??? overlay area, dialing 123-4567 and then waiting for the timing delay is fully equivalent to dialing 1-818-123-4567. That is, 7-digit dialing, followed by the timing delay, defaults to the 7 digit number in the original area code, which accommodates established 7 digit dialing patterns to pre-relief phone numbers. For a switch-based implementation, the telephone industry and/or appropriate government agencies would determine the appropriate length for this timing delay, which could range from perhaps 1 to 10 seconds, and ideally might be about 3 to 4 seconds. The industry could also customize the length of the timing delay on a customer-by-customer (number-by-number) basis. Thus, one customer might request that all calls dialed from his or her phone use a 3 second delay. Another customer might similarly request an 8 second delay for calls from his or her phone. Finally, customer premises equipment used to achieve this dialing functionality in a standard overlay area can readily be programmed with the precise timing delay desired by the user, using methods well-known in the art.

Other variations on the timing delay may be necessary in order to avoid misdials. These variations might include: 1) When the child overlay is first implemented, there will not be many numbers in the new area code (same as a standard overlay), so the chances of too short of a delay causing a misdial early on is very low. This might justify a relatively short timing delay at first implementation—say 3 to 4 seconds. As the months go by—if warranted by frequent misdials—the delay could be gradually increased as the new area code grows more populated. 2) A few seconds after 7 digits have been entered, a recorded message could play that would give instructions on how to input the 8th digit—"for 818 area code—enter 0, for 626 area code—enter 1," etc After a few more seconds it might say "at the tone, your call will default to the 818 area code . . . beep". 3) If certain numbers were consistently misdialed, those numbers might be selectively blocked from 7 digit default dialing—or people could request that they never receive any 7 digit default calls. This would not harm the functionality of the plan. These customers would still be able to dial with 7 digit default (protecting auto dialers, burglar alarms, fire alarms, etc.), but their own number would no longer be reachable that way. 4) Or, the 7 digit default method might serve only as a transition device during the first 6 months to 1 year of implementation. If misdials do become problematic, it could be phased out altogether. This would still leave the overlay area with a very functional and efficient 8 digit abbreviated dialing plan.

For calls originating within the overlay area, the telephone number conversion device, whether in a telephone company switch, a modified custom calling service, or in customer premises equipment, would operate as follows: Once 7 digits are received, the call will be considered legal. However the number conversion device will wait an additional predetermined timing period for a possible 8th digit, which is the 'overlay area code selector'. If the timing delay elapses before the 8th digit is received, a suffix of '0' is assumed, and the 7 digit call will automatically be directed to the 818 (parent) level of the overlay.

If 8 digits are received before the timing delay elapses, the conversion device will analyze the number, examining the 8th digit first. If the 8th digit is a '0', the call will be directed to the 818 (parent) level of the overlay. If the 8th digit is a '1', the call will be directed to the 626 (first child) level of the overlay.

If the predetermined 'timing delay' elapses and less than 7 digits have been received, the call is considered abandoned, and the standard 'try again' message is given.

Once the proper overlay level is determined and the call is routed to the proper area code within the overlay area, the suffix is discarded, leaving a standard 7 digit number to be routed by traditional 7 digit switching logic. All of the above is readily implemented, using methods well-known in the art, in the switching or custom calling service device at telephone company central offices, and/or in customer premises equipment, by taking a 7 or 8 digit number and converting it into the appropriate 7 digit or 10 or 1+10 digit number, then signaling it to a normal telephone company switch in a standard overlay, or even non-overlaid, situation.

To summarize, all '7 digit+timing' or '7 digit+suffix' calls are converted to 10 or 1+10 or 7 digit numbers as appropriate, by the phone system or by the customer premises equipment, and are then transparently routed to the proper overlay level. It is to be noted that 10 or 1+10 digit dialing for intra-overlay area calls would also be supported, if that is how an individual preferred to dial, but it would not be mandatory. As such, the dialing plan according to the invention integrates seamlessly with the standard overlay method.

For local or toll calls originating within the overlay area, but directed outside of that area, mandatory 10 or 1+10 digit dialing would be used. This requires no change whatsoever to the existing method of placing calls outside an overlay area. If someone in the overlay area were to accidentally use the '10+x' or '1+10+x' format (because they had become accustomed to dialing 8 digit phone numbers) it wouldn't matter because in 10 or 1+10 dialing, all extra digits beyond 10 or 1+10 are ignored, just as they always have been.

For calls originating outside the overlay area which are directed into the overlay area, standard 10 or 1+10 digit dialing would be used. If someone from outside the overlay area were to accidentally use the '10+x' or '1+10+x' format (because they were unclear as to the correct dialing rules in the overlay area) it wouldn't matter because in 10 or 1+10 dialing, all additional digits are ignored. Again, this does not in any way change how someone outside the overlay area dials into the area.

The overlay method heretofore described integrates well with existing directory listing practices, because numbers within an overlay area can all be listed with 8 digits. Thus, for example, in the 818/626 telephone directories the numbers will be listed as follows:

| | | |
|---|---|---|
| 818 number | 999-3360-0 | |
| 626 number | 956-2200-1 | |
| 213 number | 213-462-2110 | (out of 'overlay area' number) |
| 626 number | 347-9426-1 | |
| 818 number | 883-6234-0 | |
| 310 number | 310-244-0177 | (out of 'overlay area' number) |

(out of 'overlay area' number)
(out of 'overlay area' number)

In the above, 7 digits+'0'=818 area code; 7 digits+'1'=626 area code. Because no area codes would need to be listed for intra-overlay area phone numbers, the 'new' 626 numbers (which a new business might have) will not stand out as red flags to customers looking for experienced services. Only out of 'overlay area' phone numbers would stand out, the same as they already do in current directories. This would not be a flag for the business being "new," it would simply be a flag for the business being out-of-area, as it is at present.

To further remind people how the system works, a sticker could be supplied to customers in the 818/626 area that said, e.g., "8 digit dialing supported: 7 digit phone number+0=818 area code; 7 digit phone number+1=626 area code." The public can be informed about the use of the new plan, for example, with easy-to-understand language such as: "For calls made from any telephone within the 818/626 overlay area to any phone number with an 818 area code (818 is the original (or "parent") level of this overlay area): You may dial all 818 area code telephone numbers exactly as you always have in the past using just 7 digits. After a short delay your call will go through.

You may avoid this delay by dialing the 7 digit number+0.

For calls made from any telephone within the 818/626 overlay area to any phone number with a 626 area code (626 is the first new (or "child") level of this overlay area): You must dial all new 626 area code telephone numbers as the 7 digit number+1.

For calls made from any telephone within the 818/626 overlay area to phone numbers in area codes outside of the 818/626 overlay area: Dial 1+area code+7 digits—the same as you would before the overlay went into effect.

For calls made from area codes outside of the 818/626 overlay area to any area code within the 818/626 overlay area: Dial 1+area code+7 digits—the same as you would before the overlay went into effect." This plan addresses customers' objections to using overlays which they fear would result in confusion and/or the inconvenience of having to dial 11 digits just to call across the street.

To ease the public's transition to overlays, simple 7 digit dialing to all existing (pre-relief) parent level numbers is maintained (this is also a benefit for children, the elderly/handicapped, and automatic dialing systems).

The plan allows for abbreviated '7 digit+suffix' dialing from and to any phone within the entire overlay area, without affecting how 10 or 1+10 digit calls 'out-of', 'into', or 'within' the overlay area are handled. It is expandable to 10 levels (0-9) of overlay within a single geographic dialing area, allowing for painless addition of many new numbers in the future.

Additionally, the new style of directory listings which this dialing plan permits won't be a disadvantage for new businesses.

For the public, this plan will have the psychological appeal of being a new 'high tech' solution to the challenges presented by splits and standard overlays. It responds to all of the public's concerns about overlays, and will leave citizens and businesses with a feeling that something is finally being done to protect them from the expense and disruption that traditionally comes with area code exhaust and relief.

When the advantages of this plan are weighed against the disadvantages of area code splits and standard implementations of overlays (expense, disruption, confusion, inconvenience, permanent impact on the size of geographic dialing areas, etc.), this unified dialing plan for overlays clearly makes sense as a solution for both the short and the long term.

This system can be applied to any area that is faced with the need to introduce an overlay. If this system becomes a standard, over time large areas of North America would be able to locally take advantage of this plan without affecting how any 'out of area' or 'into area' dialing and switching is handled.

In short, this numbering plan greatly reduces the confusion and inconvenience that is associated with having multiple area codes within individual neighborhoods and households. Because the plan is non-disruptive to existing 7 digit and 10 or 1+10 digit dialing patterns, no one is put in jeopardy by a change to their local dialing plan (especially children and elderly/handicapped), and it ensures that existing auto dialers can complete calls without reprogramming. This plan reduces the likelihood that the new overlay area code will be a stigma for new businesses. Finally, it ensures that costs to businesses and disruption overall will be kept to a minimum.

It is important to note that this plan according to the invention can be used even when there is not a unique original area code. In these cases, only the 8 digit "unifying" feature of the plan would be implemented. This situation would occur if an overlay were implemented on top of two existing distinct area codes. In this case, the 7 digit default would only be used as a transition vehicle for each of the original area codes, and then would be phased out, leaving the 8 digit system in place.

The 8-digit-only version of the plan could also be used where a standard overlay has already been implemented. In these cases, the 7 digit feature of the plan would not be used at all, but the 8 digit feature could be implemented and save callers 3 digits on each call. The 8 digit feature could also be used to tie together geographically distinct area codes that will not be overlaid, simply as a way to avoid having to dial 10 or 1+10 for out of area code calls.

Where two existing NPAs are overlaid, the transition would take place in two phases. In the discussion following, Area Code A signifies either of the existing area codes, Area Code B signifies the other existing area code, and Area Code C signifies the new overlay area code. Note, to avoid confusion with situations where there is only one original area code, the '0' suffix should not be used in cases where there are two or more original area codes.

In phase one, before implementing the overlay, each of the two existing NPAs would separately migrate from 7 digit to 8 digit dialing using the 7 digit default as the transition vehicle (10 or 1+10 digit dialing within each area code would also be enabled at this time). Area Code A would migrate to 7 digit+ '1' suffix, and Area Code B would migrate to 7 digit+'2' suffix. In either case, 7 digit calls (with a delay) would default to the area code of origin during the permissive period. It is important to recall that in this situation, the two area codes are in separate geographic areas, so 7 digits can default to the area code of origin without confusion. During this period it might be possible to dial between the two area codes using either the 8 digit option or standard 10 or 1+10 digit dialing.

In phase two, at the end of the permissive dialing period, each of the existing area codes would have separately migrated to 8 digit or 10 or 1+10 digit dialing for all calls, and the 7 digit default method will no longer be available for either area code. At this point 8 digit dialing and 10 or 1+10 digit dialing would be available for all calls within and between Area Codes "A" and "B". The third area code would now be overlaid and could immediately use 8 digit or 10 or 1+10 digit dialing for all calls within the "A B C" Area Code Grouping. The 8 digit numbers in this new overlaid area code ("Area Code "C") would be 7 digit+'3' suffix. This results, finally, in all three area codes being unified with the 8 digit dialing option. Naturally 10 or 1+10 digit dialing would also be an available dialing method, for anyone who wishes to use it.

Even if this plan is not adopted as a North American standard, it integrates seamlessly with the existing standard overlay method, as well as with established methods for dialing within and between non-overlaid area codes. Thus it is possible for computerized customer premises equipment (CPE), using methods well-known in the art, to operate according to the lower flowchart of FIG. 5, and thus convert 7 and 8 digit numbers into the appropriate 10 or 1+10-digit numbers, and then transmit these 11-digit numbers out to phone company switching equipment that uses only the standard techniques for dialing within and between overlaid and non-overlaid area codes. This CPE could optionally be supplemented with a set of "hot buttons" on the phone which would be programmed to specific 3 or 1+3 digit area codes. By pressing one of these buttons at the start of a call, one could dial a 10 or 1+10 digit phone number with only 8 key presses (hot button+7 digit number). Or, the 7 digit number plus 1 digit suffix method earlier described can be used, as desired by the user. Users of such a CPE device, using programming "setup" methods that are well known in the art, could choose their own suffixes to associate with each area code within the overlay area, and could determine for themselves which area code gets the "0" suffix and hence can be dialed merely by 7 digits plus a timing delay. Additionally, such a CPE device can work in situations other than overlays if a user wishes to enjoy abbreviated dialing between separate non-overlaid area codes. Thus, for example, not limitation, a user can associate a digit (e.g., 0 through 9) with the ten area codes he/she dials most often. Then, by dialing a seven digit number plus one of the area code-associated digits, the user can achieve 8-digit dialing into ten different area codes. This CPE can be attached to a phone line or to a preexisting phone as an add-on module, or it can be integrated directly with the telephone as a unitary device. Use of the word "telephone" above, and throughout this disclosure, is intended and understood to include facsimile machines, autodialers, computers, and any other devices that can be connected to a phone line or a wireless service connection, and which can generate the tones and/or pulses necessary to place a telephone call.

It should be noted that while numbers in all of the area codes within the geographic overlay area can be reached by dialing either '7+suffix' or '10 or 1+10', the '7 digit default' dialing option (which requires a timing delay) applies only to numbers in the original area code and only under default conditions. On the surface this would seem to offer preferential dialing to certain numbers (which would be counter to the FCC's mandate for dialing parity in overlays). However, on closer examination it becomes clear that very few people would intentionally take advantage of this option. Because of the timing delay when only 7 digits are dialed, customers will quickly opt for dialing the 8th digit (in this case '0') in order to complete calls in the most expedient way. This 7 digit option is really only provided in order to ease the transition into an overlay scenario, and to act as a safety net for old "7 digit style" calls which would otherwise be lost. It provides an extremely long permissive dialing period, ensures that any phone number that had been dialed with 7 digits in the past could still be dialed the same way, and minimizes the need to immediately update auto dialers and databases. More than likely, (after implementation of this invention), 7 digit calls will only be initiated by auto dialers which had been programmed pre-relief (i.e. alarm system auto dialers), and which are typically difficult or costly for their owners to update. In short, from a dialing parity standpoint, 7 digit dialing plus a timing delay is on a par with 8 digit dialing and no timing delay, i.e., the dialing of an eighth digit and the waiting for a timing delay are equivalent with one another insofar as they might deter a user from choosing a service provider for whom one option would be used over the other.

As has been mentioned several times, this invention can also be implemented by telephone company switching equipment as a modified custom calling service. It could be integrated into the network either as a general feature available to all customers as part of their basic monthly service, or as a subscription based feature available only to customers who pay a monthly fee or a pay per use premium. As an example, if this custom calling service were activated when the customer entered *?? (where ?? are any two digits selected by a telephone company for this purpose), the switch would be signaled that a 7 or 8 digit (rather than 10 or 1+10 digit) call is about to be dialed. But entering the *?? would of course reintroduce extra dialing digits which this invention is designed to eliminate, so other approaches might also be considered.

For example, not limitation, instead of initiating the custom service by dialing a *??, this service could be automatically triggered if the customer began his call with a "2" through "9". The custom service would then "watch" as digits were entered, and "decide" what to do with any given number. Naturally 411, 911 and other special services would immediately be released to the network after only 3 digits are entered. Seven (7) digit calls would not be released until after the timing delay, and both 7 and 8 digit calls would be translated into the proper 3 digit area code+7 digit phone number before entering the network. Calls beginning with a 0 or a 1 would not trigger this service, since it could be assumed that these numbers were going to be dialed as full 10 or 1+10 or 0+10 digit numbers (and thus would not be using 7 or 8 digit dialing). And, since a caller can always choose to dial with either the reduced-digit option, or the full 10 or 1+10 digit number, using 7 or 8 digit dialing might automatically be billed as a premium service, while the use of full 10 or 1+10 digit dialing would be billed as a standard (non-custom) service.

If this dialing method is implemented by the phone companies as a custom calling feature, or through CPE, the customer might be able to specify that any given area code is the "parent style" area code. This would allow for 7 digit default dialing to any area code of the customer's choosing, and could be used for both overlaid and non-overlaid situations. If each customer could select which area code defaulted to 7-digit dialing, then every customer would get to choose exactly one area code for 7 digit dialing, and there would be no possible advantage or disadvantage to anyone, either placing calls or receiving calls. This further overcomes any concerns that may arise regarding dialing parity.

The same user-selectable approach can be used for the "child style" area codes. Here, using a customized calling service, or CPE, each user could specify that a certain group of area codes is to be dialed with either one digit at the beginning of the dialing or one digit at the end, and the user could specify which area codes are associated with which digits.

Further, the user could select one area code for pure 7 digit dialing (no timing delay). Thus, if a user wanted to still be able to make all of his or her 818 calls by only dialing 7 digits, the user would tell the switch that any call placed by that user which doesn't start with a 0 or a 1 will always be a call intended for the 818 area code. Another customer might prefer to make 626 his or her special 7 digit area code. If this feature could be changed at will, the user could make his or her phone behave as if it were located in any area code, at any time. A phone in California, for example, would be able to dial 7 digit numbers in a New York area code! A display on the user phone or similar device could show what area code is assigned as the special 7 digit area code (similar to the caller ID display). A device or telephone similar to the "hot button" device disclosed earlier can also be included. Thus, when the user presses the hot button, it remains selected (or ON) until it is turned off, or until a different area code "hot button" is selected. In this way, after choosing an area code, all calls dialed afterwards may be dialed with only 7 digits (not 8). This could make the user's telephone behave exactly as it did before the overlay. Or, if the user wanted to place many calls to the 202 area code, he or she could press or program the 202 button, and from then on dial all calls to that area code using only 7 digits. Similarly, an OFF switch can be provided, so that one can bypass any of these special dialing features. This would help new users feel "safe" with this device.

All of the above, it is again noted, can readily be implemented through phone company switches, and/or through computerized CPE.

Figure 9A:
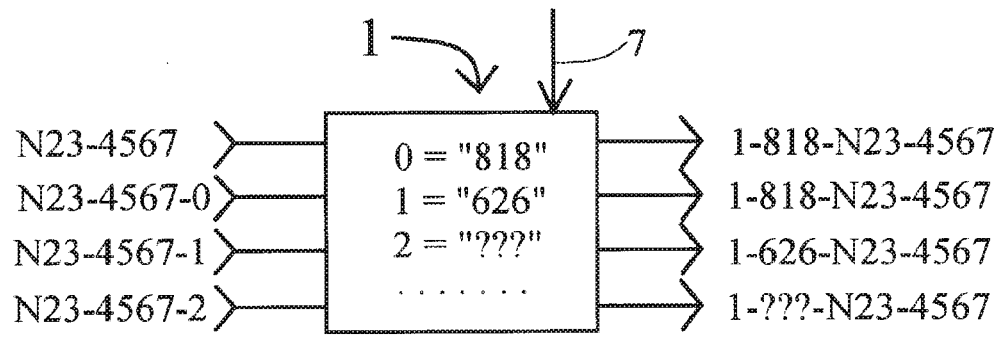
FIGS. 9a, 9b and 9c are schematic input/output diagrams illustrating a computerized apparatus according to the invention, and the use of this apparatus in connection with a telephone company switch and a customer premises equipment device.
Figure 9B:
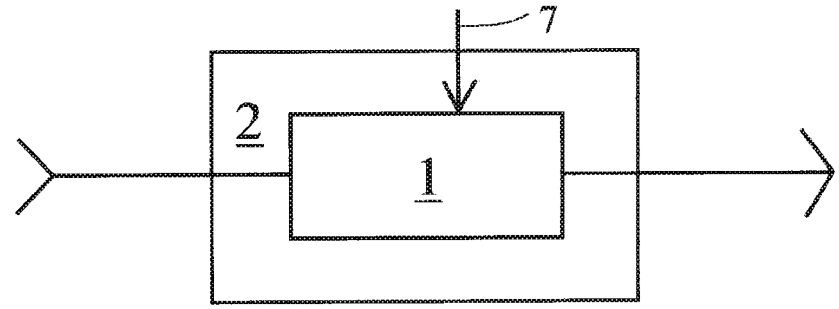
Figure 9C:
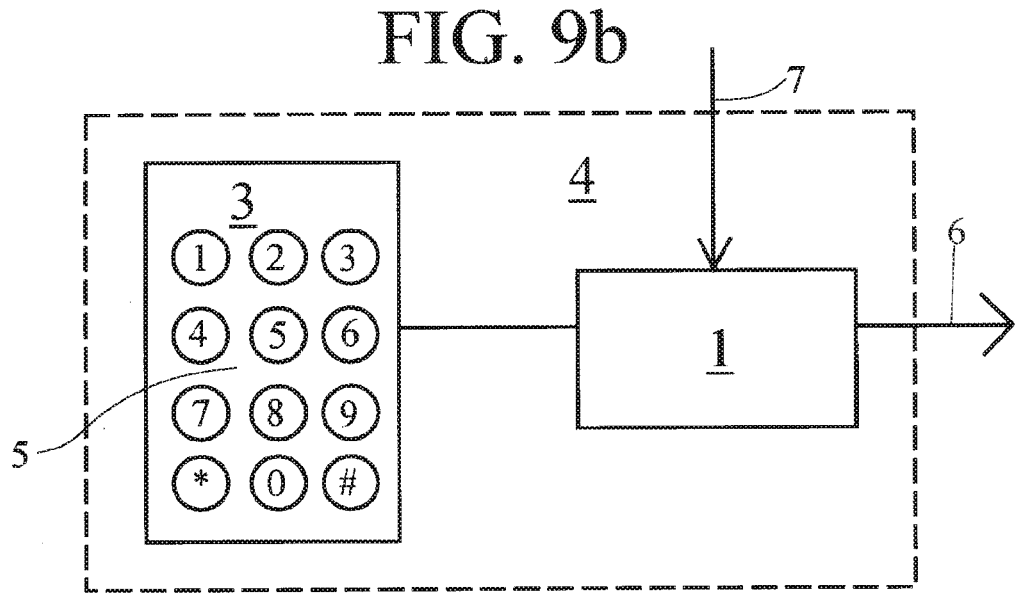

FIG. 9 illustrate a preferred embodiment of the underlying computerized device of the invention. FIG. 9a, using an 818/626/??? overlay area as an example, illustrates computerized telephone number conversion device 1 which accepts the dialing tones of a 7 or 8 digit telephone number as input, determines by means of an association table which area code to associate with each overlay selector (including timing delay expiration with no selector, which defaults to the parent (e.g. "0") selector, and outputs a 10 or 1+10 digit number corresponding to the full 1+area code+local number of the number being dialed. The direct, one-to-one mapping between 8-digit numbers and 10 or 1+10 digit numbers according to the invention makes the device 1 extremely simple to implement using methods well-known in the art. Naturally, any time it is detected that a "0" or a "1" is the first digit dialed (e.g., the caller dials 1-818-N23-4567), the conversion is deactivated, and the number as dialed is simply passed through conversion device 1 unaltered. Similarly, the association table would contain special numbers such as "911", "411", etc. that, if detected, are simply passed through unchanged.

The modular device 1, in turn, easily integrates into a number of settings. As shown in FIG. 9b, it can easily be incorporated into a telephone company switch 2 (or a PBX-type system at a customer site), and can thus be used to detect incoming 7 or 8 digit numbers, convert them into 10 or 1+10 digit numbers, and signal the full 10 or 1+10 digit number associated with the incoming 7 or 8 digit number. As noted earlier, this may or may not be provided to the customer as a custom calling service.

In the CPE variation, module 1 is connected to an ordinary, preexisting telephone 3. It converts 7 or 8 digit numbers dialed at the telephone keypad 5 into the correct associated 10 or 1+10 digit numbers, and then sends these converted numbers to the telephone switch over telephone line 6. Alternatively, telephone 3 and module 1 can be incorporated together into a unitary "enhanced" telephone 4, which similarly converts the input 7 or 8 digit number into a 10 or 1+10 digit number and sends that number out over the telephone line 6. In either event, this CPE device gives the telephone user the option to simplify his or her dialing whether or not the telephone company itself chooses to implement this invention systemwide. And, in the event the simplified dialing of this invention is implemented as a custom (premium) calling service, this CPE device enables the user to avoid paying the premium for this custom calling service, and at the same time enjoy the benefits of this simplified dialing.

For all of these variations, programming means 7 are used to program and customize module 1, using methods well-known in the art. This can include establishing the relationships between overlay selectors and area codes, setting the timing delay, programming "hot buttons" for the CPE device, etc.

Finally, the methods described above lend themselves as well to a non-disruptive method for what to do when all 800=8×10×10 of the original 3 digit (NXX) area codes are used up. (N=2 through 9, X=0 through 9.) This method involves introducing new 5 digit area codes, where the 4th digit will always be a 0 or a 1, and the fifth digit may be 0 through 9. This will create a system for adding 800×2×10=16,000 more area codes without disrupting how existing numbers are dialed.

In this method, all 800 original area codes will be able to be known as either the NXX00 or as the original NXX. All new area codes will be NXX01-NXX09 or NXX10-NXX19. When the dialing doesn't start with a 0 or a 1, the telephone number conversion device detects this and determines that the number is being dialed without an area code prefix, so it will treat the call as a conventional 7 digit call, or a 7 or 8 digit call according to the invention as heretofore described. If the dialing does start with a 0 or 1, the telephone number conversion device detects this and determines that the number following will be either a 3 digit or 5 digit area code.

In this case, if the 4th digit that follows the 'original 0 or 1' is not a 0 or a 1 (i.e., if it is a 2 through 9), then the telephone number conversion device interprets this to mean that an original 3 digit area code is being used, and the call will be able to be completed without dialing the full 5 digits for the area code. This takes advantage of the fact that standard 7 digit numbers are always in the form N23-4567, where the first digit N runs from 2 to 9. As such, this method is non-disruptive for dialing to these original 800 established 3-digit area codes, since a call to a number in these area codes will always be able to be completed the same as it is today—with a 1+XXX+7 digit number—or—optionally, with a 1+NXX00+7 digit number.

If the 4th digit that follows the 'original 0 or 1' is a 0 or a 1, the telephone number conversion device will recognize that a 5-digit area code is being dialed, will await the fifth number of the 5 digit area, and will then signal the seven digits provided thereafter into the given 5-digit area code. That is, all new 5 digit area codes will be recognized because of the 0 or 1 in the 4th position, and these will only be reachable by dialing the full 5 digit area codes.

While the use of a single-digit suffix will suffice for an overlay area encompassing up to ten area codes (which should cover any overlay situations likely to develop for the foreseeable future), if an overlay area in the future were to include more than ten area codes, then a two-digit suffix would be required. In essence, the single-digit overlay codes would be supplemented with a second overlay selector code digit, enabling up to 100 area codes to coexist within one overlay area. Intra-overlay calling would then use either 7 digit plus timing delay, 8 digit plus timing delay or 9 digit dialing, rather than just 7 digit plus timing delay or 8 digit dialing as described above. While it is unlikely that an overlay area will grow to cover more than ten area codes anytime soon, such a two-digit suffix is nevertheless encompassed by this disclosure and its associated claims.

Irrespective of whether this system is uniformly adopted, CPE can readily be programmed using methods well known in the art to enable a telephone user to enter area codes in accordance with the above.

An alternate embodiment of this invention illustrated by FIGS. 7 and 8 involves implementing overlays in a manner which would create "child" area codes spawned from the original area code, but these new codes would appear to actually share the original area code's name. To the network, these area codes would be known as, for example, 818-A, 818-B, 818-C, etc. This method would allow customers everywhere (even outside of the overlay area) to be able to dial "1"+the 3 digit "818" area code+an 8 digit (7 digit+X) number, and have the suffix digit determine the intended overlay (area code) level. As with the earlier embodiments, the original area code could have the suffix "0", and be dialable with either 1+3+7 digits+timing delay or 1+3+7+X. Within the affected area, all calls could be made by dialing only 8 digits or 7 digits+timing delay.

This alternate variation will in practice be transparent to the user, while in execution (at the switching level) it will be functionally the same as a standard overlay. The 8th digit (0-9) will be treated as a suffix, and will determine which of the overlaid area codes is to be accessed. The actual switching at the local level would still be based on traditional 7 digit dialing. Customers in area codes which have not been overlaid in this manner, do not need to use 8 digit numbers when dialing local calls, or to use 1+3+8 digit numbers when dialing out of area calls, unless those calls are being sent to a multiple area code 8 digit dialing region.

In this alternate variation, local calls for the multiple 818 area code region would be handled as follows: On the switching level, the original area code, for example "818", will be known as 818-A and the first level of overlay will be known as 818-B, etc. After the central office receives the traditional 7 digits, there will be a courtesy pause of 3 to 7 seconds, which will allow the user to enter a '0' or '1' or nothing. If no 8th digit is entered, the system assumes '0' and directs the call to 818-A. This feature allows all existing phone numbers to still be accessible by dialing only the original 7 digit number. If a '0' is entered, the system also directs the call to 818-A. If a '1' is entered, the system directs the call to 818-B. Once the number arrives at 818-A or 818-B, it is switched at the central office as a normal 7 digit number (the new 8th digit is ignored at this level—it was only necessary in determining which of the overlaid area codes to access). On the dialing level, for example, 818-A can be accessed the same as always, by dialing only the 7 digit phone number. The 8th digit '0' could be added by the user, but it is not mandatory. Thus no directories, stationary, auto dialing systems, etc., need to be changed. 818-B will be accessed when the user supplies a '1' for the 8th digit. These new numbers will always be known to the users as 8 digit phone numbers, and so no existing databases will need to be updated.

In this alternate variation, calls coming into the region from outside of the region will be handled as follows: On the switching level, when an out of region call is initiated with a 0 or a 1 (to access long distance or operator services), the phone system normally listens for the completion of a 10 digit number. i.e. 818-956-3360. With this variation of the invention, the phone system will listen for the traditional 10 digits, and will then supply a courtesy pause of 3 to 7 seconds which will give the opportunity for the user to enter an 11th digit (if necessary). The 10 or 11 digit phone number will then be routed to the appropriate destination area code. If the call was intended for 818, when it arrives at 818 the number is tested for a '0' or '1' suffix in the same manner as described for local calls above. If there is no 8th digit, the system assumes '0' and directs the call to 818-A. If the 8th digit is '0', the system also directs the call to 818-A. If the 8th digit is '1', the system completes the call to 818-B. Once the number arrives at 818-A or 818-B, it is switched at the central office as a normal 7 digit number. On the dialing level, 818-A can be accessed the same as always, by dialing only 1-818+the original 7 digit phone number. The 8th digit '0' can be added by the user, but it is not mandatory. Thus no out of town directories, auto dialing systems, etc., need to be updated. 818-B will be accessed when the user dials 10 or 1+818+the 8 digit phone number, using a '1' for the 8th digit. These new numbers will always be known to the users as 8 digit phone numbers, and so there is no existing data that needs to be updated. In the future numbering demands could be met by implementing overlay levels 2 through 9 as needed.

The unified method and apparatus to simplify telephone area code dialing is a non-disruptive solution for area code relief which is both competitively neutral and consumer friendly. It provides a technically workable alternative for area code relief which minimizes hardship to local business and the public.

New numbers can be added to a geographic area without changing the way that existing numbers are dialed. Established 7 and 10 or 1+10 digit dialing patterns are maintained and a new 8 digit option is enabled which allows for abbreviated dialing within and between all area codes in the geographic overlay area.

Further, the plan demonstrates how dialing parity (mandated by the FCC) can be maintained in an overlay without requiring the full 10 digit (or actually 1+10 digit) phone number to be dialed.

The invention disclosed herein might, at first glance, seem to call upon techniques which previously have been rejected by the Telecommunications Industry and Public Utility Commissions. But a closer examination demonstrates that these techniques, as proposed here, solve rather than create problems. The cost of implementing the plan for an affected region may well be less than the overall cost (cost to business, cost to public and cost to telecommunications industry) of an area code split.

Figure 10:
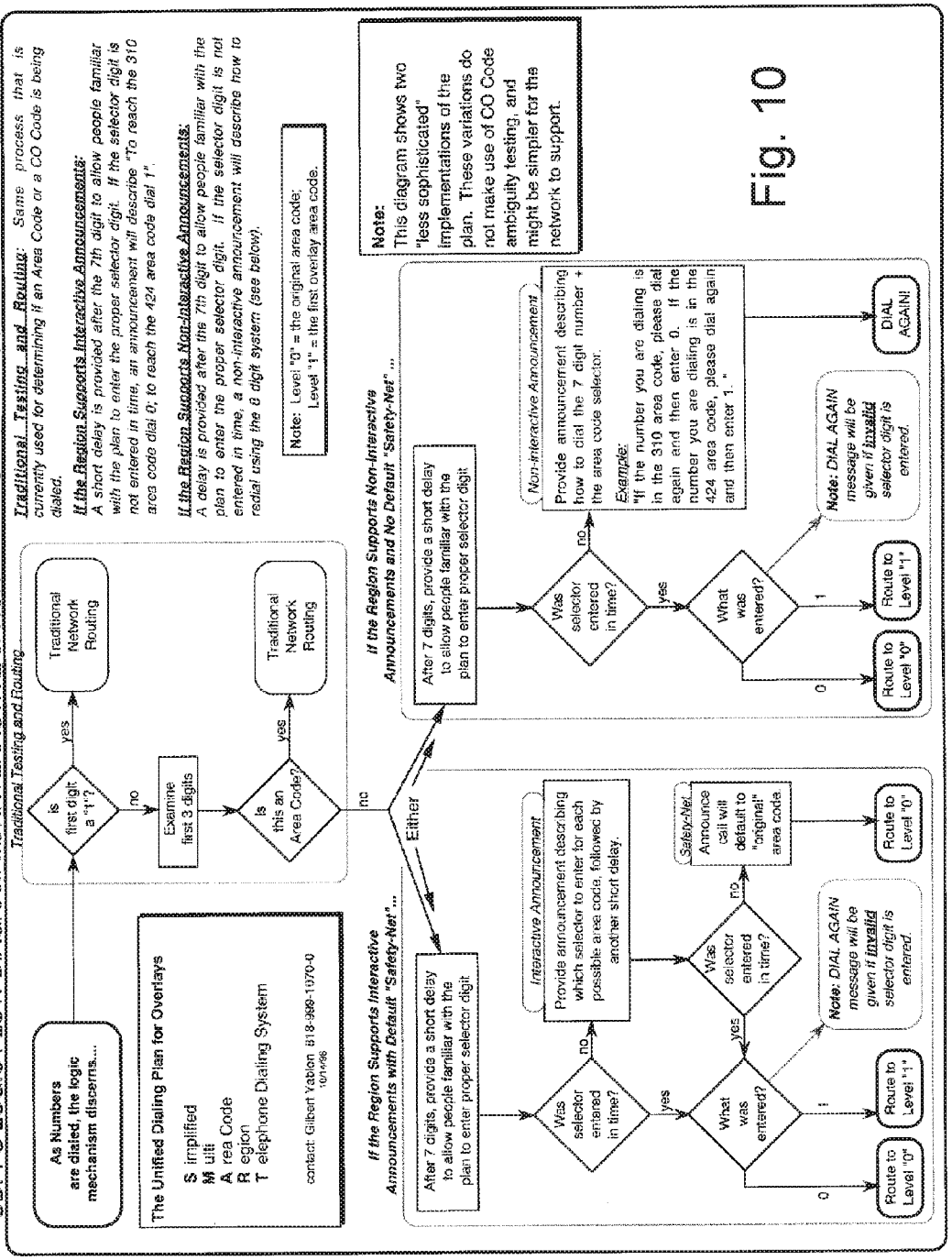
FIGS. 10-12 are flowcharts illustrating in varying levels of detail how the unified dialing plan for overlays is achieved in connection with traditional testing and routing methods, and in connection with interactive and non-interactive announcements (messages).
Figure 11:
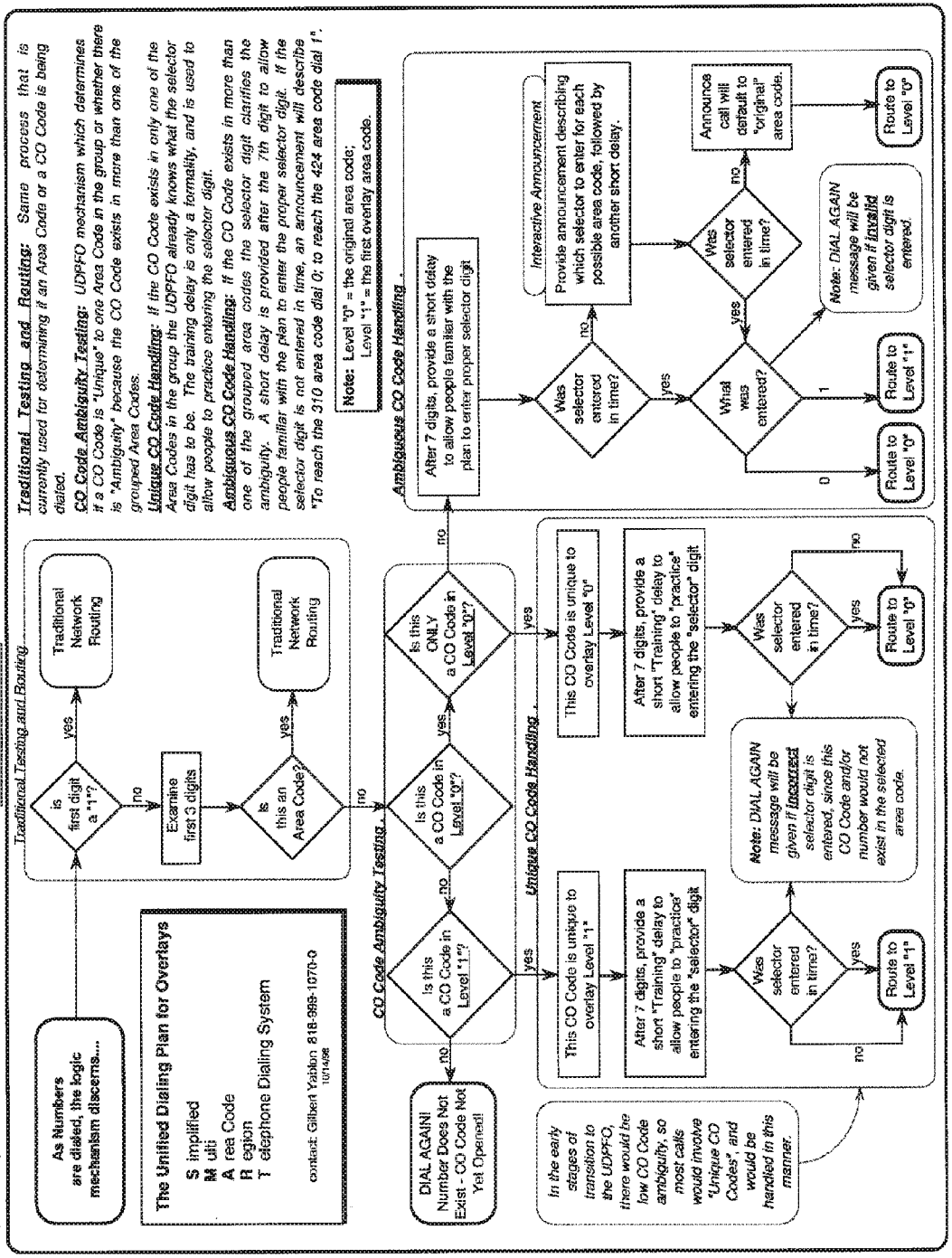
Figure 12:
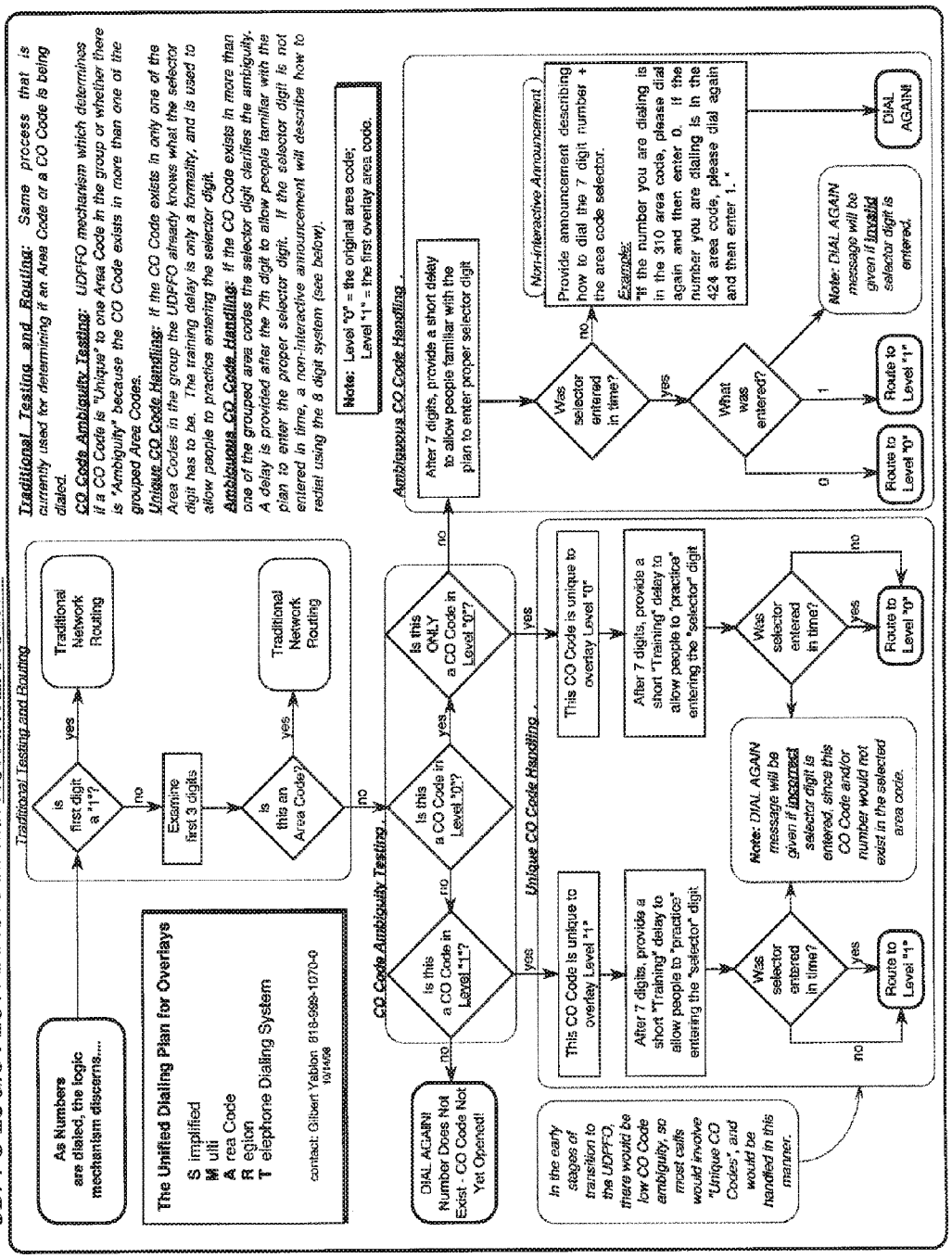

FIGS. 10 through 12 illustrate in varying levels of detail how the unified dialing plan for overlays is achieved in connection with traditional testing and routing methods, and in connection with interactive and non-interactive announcements (messages). In particular, to conserve numbering resources, many telephone companies define a limited number of 3-digit area codes that can be dialed in a given local region without a leading "1", while the remaining combinations of three leading digits are defined (or deduced from the defined area codes) to be the three-digit prefixes of seven-digit local telephone numbers. (see, for example, the box labeled "CO code ambiguity testing" in FIGS. 11 and 12.) This information locally defining which three digits sequences are to be regarded as area codes and which are to be regarded as central office codes is typically contained in a database maintained by a telephone company, and it varies both by region, and over time as numbering resources are assigned or reassigned. If the user employs customer premise equipment in accordance with the practice of this invention, then the user may locally define his or her own such database.

Thus, these figures illustrate in the flowchart boxes labeled "traditional testing and routing" how if an initial dialed digit is detected to be a digit "1", then the next three digits are regarded to be a three-digit area code, while if the initial dialed digit is detected to be a digit other than "1", then further test are made on the first three digits including the initial dialed digit. If it is determined that the initial dialed digit combined with said first and second digits following, comprises a three-digit area code, then a call is signaled to the receiving telephone device at a three-digit area code represented by the initial dialed digit combined with the first and second digits following, and at a 7-digit telephone number represented by third through ninth detected digits following the initial dialed digit. Alternatively, if the initial dialed digit combined with the first and second digits following are determined to not comprise an area code, then the initial dialed digit combined with the first and second digits following is regarded to comprise a central office code, and the central office code combined with third through sixth detected digits following the initial dialed digit is regarded to be the 7-digit telephone number of said receiving telephone device. The overlay selector code is then set to the seventh detected digit following the initial dialed digit.

Also shown in these figures, for example not limitation, are various interactive and non-interactive messages/announcements that can be used to help the telephone user easily place calls.

Figure 13:
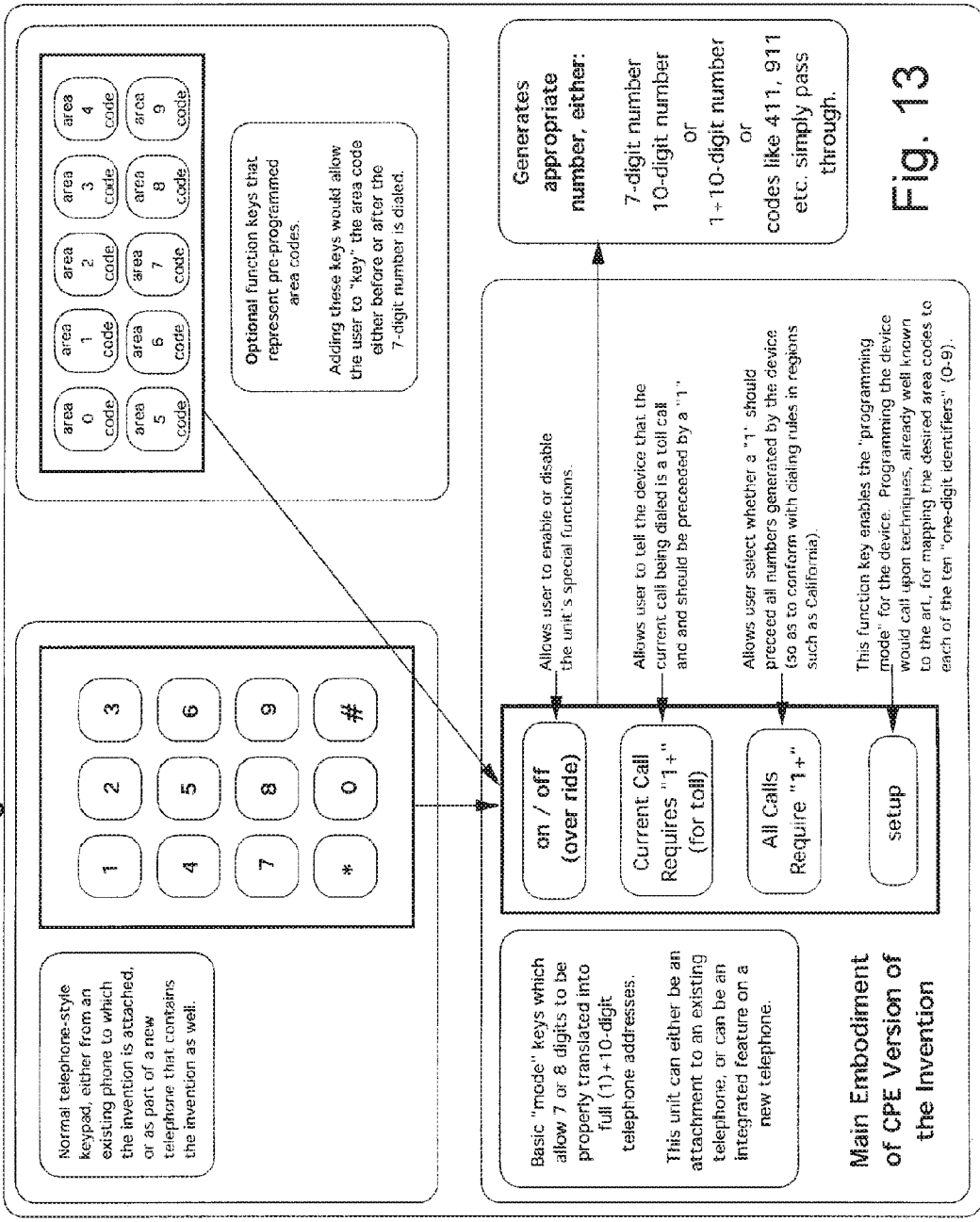
FIG. 13 is a block diagram illustrating a customer premises equipment embodiment of the invention in further detail including area code function keys.
Figure 14:
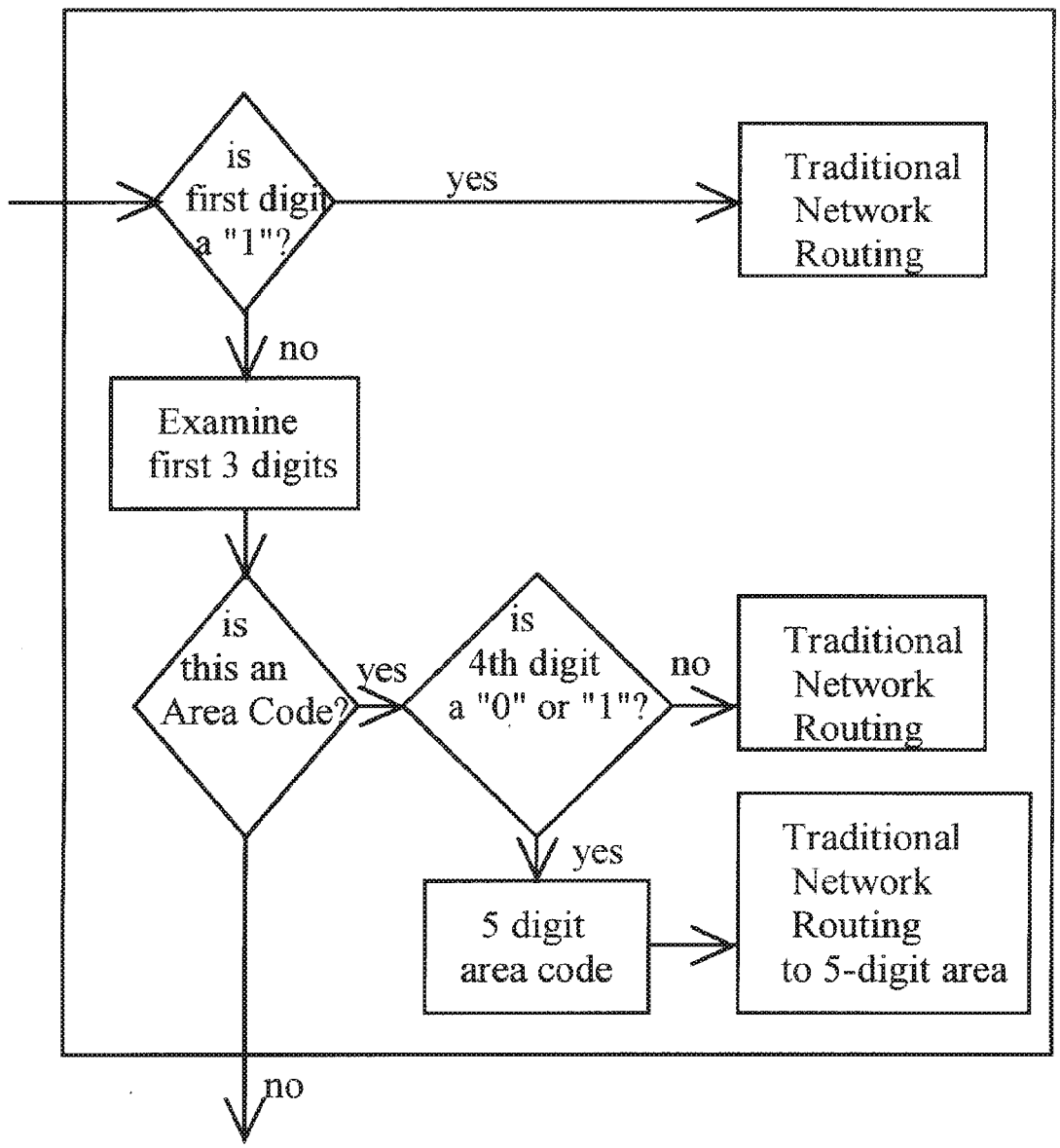
FIG. 14 is a flowchart illustrating the extension of the traditional testing and routing of FIGS. 10-12 to the five-digit area codes disclosed herein.

In the discussion and claims, the word "digit" is often used to refer to the traditional numbered keys "0" through "9" and the "*" and "#" keys traditionally found on a telephone. However, insofar as particular "digits" are used as shorthand "codes" to represent and enable simplified dialing of overlays and/or area codes, it is understood that the word "digits" is more broadly defined and understood to comprise, for example, telephone device function "keys" that by a single depression also represent and enable simplified dialing of overlays and/or area codes. This is illustrated, for example, in the block diagram of FIG. 13 illustrating a customer premises equipment embodiment of the invention which includes area code function keys. In the particular illustrated embodiment, the user can have up to 20 "speed-dial" area code "digits," ten of which are associated with the traditional "0" through "9" keys, and the other ten of which are associated with the ten illustrated area code keys. It is also noted that the telephone number memories found on many telephones can, if desired, be programmed to hold three-digit area codes that can then be recalled from memory and used in a similar manner to the ten illustrated area code keys.

It is also noted that the customer premises equipment can set any additional detected digit in any user-predetermined position in the dialing sequence to be the area code selector code, i.e., that the user ought not be restricted to having this additional detected digit be the final digit dialed after the local telephone number. It is also noted, since telephone companies in some areas permit 1+10 or 10 digit dialing, while in other areas only 1+10 digit dialing is permitted, that customer premises equipment preferably will comprise a switch or similar means for setting the customer premises equipment to send out touch tone signals in a manner consistent with the local dialing rules. Finally, it is noted that the aforementioned information locally defining which three digits sequences are to be regarded as area codes and which are to be regarded as central office codes is typically contained in a database maintained by a telephone company, and varies both by region, and over time as numbering resources are assigned or reassigned. As noted, if the user employs customer premise equipment in accordance with the practice of this invention, then the user may locally define his or her own such database, or may even download this database from the pertinent telephone company. However, in the preferred embodiment, the customer premise equipment simply transmits any suitable dialing sequence without a preceding "1" directly to the telephone company as is, so that the telephone company's own database, which will always be accurate and timely, completes all of the testing (and user advisory messaging as necessary) to determine which leading three-digit sequences are area codes, which are central office codes, and which are invalid codes.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. A non-transitory computer-readable medium comprising a set of instructions executable by a computerized system for extending and adding new dialable numbers to the North American Numbering Plan in a non-disruptive manner while preserving established dialing patterns, and within the extended North American Numbering Plan, signaling telephone numbers from a calling telephone device to a receiving telephone address, said computer-readable medium comprising one or more instructions for:

if an initial digit used to place a telephone call is determined not to be a digit "1" and not to be a digit "0," and if a fourth digit used to place a telephone call is determined to be a "0" or "1," then signaling a call to a receiving telephone device at the receiving telephone address associated with an initial three digits, combined with said fourth digit, combined with fifth through twelfth digits.

2. The computer-readable medium of claim 1, further comprising said user interface, said computerized processing, and said computerized storage for:
if said initial three digits are not a central office code, and if said fourth digit is determined to be a "0" or "1," then signaling a call to the receiving telephone device at the receiving telephone address associated with said initial three digits, combined with said fourth digit, combined with fifth through twelfth digits.

3. The computer-readable medium of claim 1, wherein the fourth digit combined with the fifth digit, comprise two new digits used to extend the existing ten-digit North American Numbering Plan to a new twelve-digit North American Numbering Plan.

4. The computer-readable medium of claim 1, further comprising said user interface, said computerized processing, and said computerized storage for:
if said fourth digit is determined to not be a "0" or "1," then signaling a call to said receiving telephone device at a telephone address associated with said initial three digits, combined with said fourth digit, combined with fifth through tenth digits.

5. The computer-readable medium of claim 1, further comprising said user interface, said computerized processing, and said computerized storage for:
if said initial three digits are not a central office code, and if said fourth digit is determined to not be a "0" or "1," then signaling a call to said receiving telephone device at a telephone address associated with said initial three digits, combined with said fourth digit, combined with fifth through tenth digits.

6. The computer-readable medium of claim 1, wherein a 3 digit area code within the original North American Numbering Plan is represented within said extended North American Numbering Plan by said initial three digits, in combination with either a digit "0" or a digit "1" as the fourth digit, in combination with a digit "0" through "9" as the fifth digit, said fourth digit combined with said fifth digit comprising two new digits used to extend the existing ten-digit North American Numbering Plan to a new twelve-digit North American Numbering Plan.

7. The computer-readable medium of claim 6, wherein said fourth digit is a "0" and said fifth digit is a "0," whereby a 3 digit area code within the original North American Numbering Plan, designated NXX, where N="2" through 9 and X="0" through 9, is represented within said extended North American Numbering Plan by NXX00.

8. The computer-readable medium of claim 1, wherein a ten-digit number within the original North American Numbering Plan is represented within said extended North American Numbering Plan as a twelve-digit number comprising: said initial three digits, in combination with either a digit "0" or a digit "1" as the fourth digit, in combination with a digit "0" through "9" as the fifth digit, in combination with said sixth through twelfth digits, said fourth digit combined with said fifth digit comprising two new digits used to extend the existing ten-digit North American Numbering Plan to a new twelve-digit North American Numbering Plan.

9. The computer-readable medium of claim 8, wherein said fourth digit is a "0" and said fifth digit is a "0," whereby a ten-digit number within the original North American Numbering Plan, designated NXX NXX XXXX, where N="2" through 9 and X="0" through 9, is represented within said extended North American Numbering Plan as a twelve-digit number designated NXX00NXXXXXX.

10. A non-transitory computer-readable medium comprising a set of instructions executable by a computerized system for extending and adding new dialable numbers to the North American Numbering Plan in a non-disruptive manner while preserving established dialing patterns, and within the extended North American Numbering Plan, signaling telephone numbers from a calling telephone device to a receiving telephone address, said computer-readable medium comprising one or more instructions for:
if an initial digit used to place a telephone call is determined to be a digit "1" or a digit "0," and if a fourth digit following said initial digit is determined to be a "0" or "1," then signaling a call to a receiving telephone device at the receiving telephone address associated with an initial three digits following, combined with said fourth digit following, combined with fifth through twelfth digits following.

11. The computer-readable medium of claim 10, further comprising said user interface, said computerized processing, and said computerized storage for:
if said initial three digits following are not a central office code, and if said fourth digit following is determined to be a "0" or "1," then signaling a call to the receiving telephone device at the receiving telephone address associated with said initial three digits following, combined with said fourth digit following, combined with fifth through twelfth digits following.

12. The computer-readable medium of claim 10, wherein the fourth digit following combined with the fifth digit following, comprise two new digits used to extend the existing ten-digit North American Numbering Plan to a new twelve-digit North American Numbering Plan.

13. The computer-readable medium of claim 10, further comprising said user interface, said computerized processing, and said computerized storage for:
if said fourth digit following is determined to not be a "0" or "1," then signaling a call to said receiving telephone device at a telephone address associated with said initial three digits following, combined with said fourth digit following, combined with fifth through tenth digits following.

14. The computer-readable medium of claim 10, further comprising said user interface, said computerized processing, and said computerized storage for:
if said initial three digits following are not a central office code, and if said fourth digit following is determined to not be a "0" or "1," then signaling a call to said receiving telephone device at a telephone address associated with said initial three digits following, combined with said fourth digit following, combined with fifth through tenth digits following.

15. The computer-readable medium of claim 10, wherein a 3 digit area code within the original North American Numbering Plan is represented within said extended North American Numbering Plan by said initial three digits following, in combination with either a digit "0" or a digit "1" as the fourth digit following, in combination with a digit "0" through "9" as the fifth digit following, said fourth digit following combined with said fifth digit following comprising two new digits used to extend the existing ten-digit North American Numbering Plan to a new twelve-digit North American Numbering Plan.

16. The computer-readable medium of claim 15, wherein said fourth digit following is a "0" and said fifth digit following is a "0," whereby a 3 digit area code within the original North American Numbering Plan, designated NXX, where N="2" through 9 and X="0" through 9, is represented within said extended North American Numbering Plan by NXX00.

17. The computer-readable medium of claim 10, wherein a ten-digit number within the original North American Numbering Plan is represented within said extended North American Numbering Plan as a twelve-digit number comprising: said initial three digits following, in combination with either a digit "0" or a digit "1" as the fourth digit following, in combination with a digit "0" through "9" as the fifth digit following, in combination with said sixth through twelfth digits following, said fourth digit following combined with said fifth digit following comprising two new digits used to extend the existing ten-digit North American Numbering Plan to a new twelve-digit North American Numbering Plan.

18. The computer-readable medium of claim 17, wherein said fourth digit following is a "0" and said fifth digit following is a "0," whereby a ten-digit number within the original North American Numbering Plan, designated NXX NXX XXXX, where N="2" through 9 and X="0" through 9, is represented within said extended North American Numbering Plan as a twelve-digit number designated NXX00NXXXXXX.

19. A non-transitory computer-readable medium comprising a set of instructions executable by a computerized system for extending and adding new dialable numbers to the North American Numbering Plan in a non-disruptive manner while preserving established dialing patterns, and within the extended North American Numbering Plan, signaling telephone numbers from a calling telephone device to a receiving telephone address, said computer-readable medium comprising one or more instructions for:

if a fourth digit used to place a telephone call is determined to be a "0" or "1," then signaling a call to a receiving telephone device at the receiving telephone address associated with an initial three digits, combined with said fourth digit, combined with fifth through twelfth digits.

20. The computer-readable medium of claim 19, further comprising said user interface, said computerized processing, and said computerized storage for:

if said fourth digit is determined to not be a "0" or "1," then signaling a call to said receiving telephone device at a telephone address associated with said initial three digits, combined with said fourth digit, combined with fifth through tenth digits.

\* \* \* \* \*